United States Patent
Sigler et al.

(10) Patent No.: US 10,625,367 B2
(45) Date of Patent: Apr. 21, 2020

(54) METHOD OF RESISTANCE SPOT WELDING ALUMINUM TO STEEL

(71) Applicant: GM GLOBAL TECHNOLOGY OPERATIONS LLC, Detroit, MI (US)

(72) Inventors: David Sigler, Shelby Township, MI (US); Blair Carlson, Ann Arbor, MI (US); Surender Maddela, Rochester Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 453 days.

(21) Appl. No.: 15/478,745

(22) Filed: Apr. 4, 2017

(65) Prior Publication Data

US 2017/0291246 A1    Oct. 12, 2017

Related U.S. Application Data

(60) Provisional application No. 62/320,081, filed on Apr. 8, 2016, provisional application No. 62/320,163, filed on Apr. 8, 2016.

(51) Int. Cl.
*B23K 11/11*    (2006.01)
*B23K 11/20*    (2006.01)
(Continued)

(52) U.S. Cl.
CPC ............. *B23K 11/115* (2013.01); *B23K 11/20* (2013.01); *B23K 11/34* (2013.01); *B23K 2103/20* (2018.08)

(58) Field of Classification Search
CPC .... B23K 11/20; B23K 2103/20; B23K 11/115
See application file for complete search history.

(56) References Cited

U.S. PATENT DOCUMENTS

| 5,302,797 A | 4/1994 | Yasuyama et al. |
| 5,304,769 A | 4/1994 | Ikegami et al. |

(Continued)

FOREIGN PATENT DOCUMENTS

| CN | 1946506 | 4/2007 |
| CN | 101043968 A | 9/2007 |

(Continued)

OTHER PUBLICATIONS

Machine translation of Japan Patent document No. 2012-152,787, Sep. 2019.*

(Continued)

*Primary Examiner* — Geoffrey S Evans
(74) *Attorney, Agent, or Firm* — Reising Ethington P.C.

(57) ABSTRACT

A method of resistance spot welding an aluminum workpiece and an adjacent overlapping steel workpiece is disclosed in which a source of a reactive metal in a diffusible state is located along a faying interface of an aluminum workpiece and an adjacent overlapping steel workpiece. The source of the reactive metal in a diffusible state may take on a variety of forms including (1) a composite adhesive layer that includes reactive particles dispersed throughout a structural thermosetting adhesive matrix or (1) a reactive alloy layer that confronts and is in proximate contact with a faying surface of the aluminum workpiece. Once the source of a reactive material in a diffusible state is in place and the workpiece stack-up is assembled, an electrical current is passed through the workpiece stack-up and between a set of opposed welding electrodes at a weld zone to ultimately produce a weld joint.

5 Claims, 12 Drawing Sheets

(51) Int. Cl.
B23K 11/34 (2006.01)
B23K 103/20 (2006.01)

(56) References Cited

U.S. PATENT DOCUMENTS

| | | | |
|---|---|---|---|
| 5,783,794 A | 7/1998 | Oikawa et al. | |
| 6,037,559 A | 3/2000 | Okabe et al. | |
| 7,850,059 B2 | 12/2010 | Kobayashi et al. | |
| 7,935,908 B2 | 5/2011 | Nakagawa et al. | |
| 7,951,465 B2 | 5/2011 | Urushihara et al. | |
| 7,984,840 B2 | 7/2011 | Kobayashi et al. | |
| 8,020,749 B2 | 9/2011 | Kobayashi et al. | |
| 8,058,584 B2 | 11/2011 | Miyamoto et al. | |
| 8,487,206 B2 | 7/2013 | Urushihara et al. | |
| 8,502,105 B2 | 8/2013 | Tanaka et al. | |
| 9,676,065 B2 | 6/2017 | Sigler et al. | |
| 2005/0218121 A1 | 10/2005 | Hayashi et al. | |
| 2005/0247679 A1 | 11/2005 | Wang | |
| 2006/0134449 A1* | 6/2006 | Sigler | B23K 9/0026 428/621 |
| 2007/0212565 A1 | 9/2007 | Urushihara et al. | |
| 2009/0255908 A1 | 10/2009 | Sigler et al. | |
| 2011/0097594 A1 | 4/2011 | Tanaka et al. | |
| 2012/0021240 A1 | 1/2012 | Urushihara et al. | |
| 2013/0189023 A1 | 7/2013 | Spinella | |
| 2013/0263638 A1 | 10/2013 | Gugel et al. | |
| 2013/0306604 A1 | 11/2013 | Sigler et al. | |
| 2014/0305912 A1 | 10/2014 | Taniguchi et al. | |
| 2014/0360986 A1 | 12/2014 | Sigler et al. | |
| 2015/0053654 A1 | 2/2015 | Sigler et al. | |
| 2015/0053655 A1 | 2/2015 | Sigler et al. | |
| 2015/0083693 A1 | 3/2015 | Schroth et al. | |
| 2015/0096961 A1 | 4/2015 | Carlson et al. | |
| 2015/0096962 A1 | 4/2015 | Sigler et al. | |
| 2015/0231729 A1 | 8/2015 | Yang et al. | |
| 2015/0231730 A1 | 8/2015 | Sigler et al. | |
| 2015/0352658 A1 | 12/2015 | Yang et al. | |
| 2015/0352659 A1 | 12/2015 | Sigler et al. | |
| 2016/0016252 A1 | 1/2016 | Edwards, II | |
| 2016/0158874 A1 | 6/2016 | Wang et al. | |
| 2016/0279732 A1 | 9/2016 | Sigler et al. | |
| 2016/0288242 A1 | 10/2016 | Sigler et al. | |
| 2016/0346865 A1 | 12/2016 | Sigler et al. | |
| 2017/0008118 A1 | 1/2017 | Yang et al. | |
| 2017/0106466 A1 | 4/2017 | Sigler et al. | |
| 2017/0157697 A1 | 6/2017 | Yang et al. | |
| 2017/0225262 A1 | 8/2017 | Sigler et al. | |
| 2017/0225263 A1 | 8/2017 | Sigler et al. | |
| 2017/0232548 A1 | 8/2017 | Carlson et al. | |
| 2017/0252853 A1 | 9/2017 | Wang et al. | |
| 2017/0282303 A1 | 10/2017 | Wang et al. | |
| 2017/0291247 A1 | 10/2017 | Sigler et al. | |
| 2017/0291248 A1 | 10/2017 | Sigler et al. | |
| 2017/0297134 A1 | 10/2017 | Sigler et al. | |
| 2017/0297135 A1 | 10/2017 | Sigler et al. | |
| 2017/0297136 A1 | 10/2017 | Brown et al. | |
| 2017/0297137 A1 | 10/2017 | Perry et al. | |
| 2017/0297138 A1 | 10/2017 | Sigler et al. | |
| 2017/0304925 A1 | 10/2017 | Sigler et al. | |
| 2017/0361392 A1 | 12/2017 | Sigler et al. | |
| 2018/0257166 A1* | 9/2018 | Sigler | B23K 11/20 |
| 2018/0272457 A1* | 9/2018 | Yang | B23K 35/0261 |
| 2019/0134735 A1* | 5/2019 | Haselhuhn | B23K 11/115 |
| 2019/0262930 A1* | 8/2019 | Sigler | B23K 11/115 |

FOREIGN PATENT DOCUMENTS

| | | |
|---|---|---|
| CN | 102059439 | 5/2011 |
| CN | 102114574 | 7/2011 |
| JP | 11342477 | 12/1999 |
| JP | 2008080394 A * | 4/2008 |
| JP | 2011224578 | 11/2011 |
| JP | 2012152787 A | 8/2012 |
| JP | 2013151017 | 8/2013 |

OTHER PUBLICATIONS

Machine translation of Japan Patent document No. 2008-080,394, Sep. 2019.*

English translation of CN 102059439 to Mazda Motor (published May 18, 2011).

English translation JP 2011224578 to Kobe Steel (published Nov. 10, 2011).

English translation of JP2013151017 to Mazda Motor (published Aug. 8, 2013).

Sigler et al., U.S. Appl. No. 15/920,784 entitled "Resistance Spot Welding Workpiece Stack-Ups Having a Steel Workpiece and an Aluminum Workpiece with a Steel Plate," filed Mar. 14, 2018.

Wang et al., "Interface microstructure and weld strength of steel/aluminum alloy joints by resistance spot welding," Applied Mechanics and Materials, vols. 117-119 (2012) pp. 1895-1899.

Zhang et al., "Effects of resistance spot welding parameters on microstructures and mechanical properties of dissimilar material joints of galvanised high strength steel and aluminum alloy," Science and Technology of Welding Journal, vol. 16 (2011) No. 2 pp. 153-161.

Weihua et al., "Microstructure and mechanical property of resistance spot welded joint of aluminum alloy to high strength steel with especial electrodes," China Welding, vol. 20 (Jun. 2011) No. 2 pp. 1-6.

Weihua et al., "Interfacial characterization of resistance spot welded joint of steel and aluminum alloy," China Welding, vol. 19 (Dec. 2010) No. 4 pp. 6-10.

Zhang et al., "Characterization of Intermetallic Compounds in Dissimilar Material Resistance Spot Welded Joint of High Strength Steel and Aluminum Alloy," ISIJ International, vol. 51 (2011) No. 11 pp. 1870-1877.

Choi et al., "A Hybrid Joining Technology for Aluminum/Zinc Coated Steels in Vehicles," J. Mater. Sci. Technol., 2010, 26(9), pp. 858-864.

Hwang et al., "Dissimilar Metal Welding of Steel to Al—Mg Alloy by Spot Resistance Welding," Advanced Materials Research, vols. 15-17 (2007) pp. 381-386.

Imaizumi et al., "Joining Aluminum Automotive Body Alloys to Mild Steel by Resistance Spot Welding," Journal of the Japan Light Metal Welding and Construction Association, vol. 17 (Feb. 1979) No. 1 pp. 10-17.

Miyamoto et al., "Dissimilar Joining of Aluminum Alloy and Steel by Resistance Spot Welding," SAE Int. J. Mater. Mauf., vol. 2 (2009) Issue 1 pp. 58-67.

Mortazavi et al., "Investigation on Joint Strength of Dissimilar Resistance Spot welds of Aluminum Alloy and Low Carbon Steel," Advanced Materials Research, vols. 264-265 (2011) pp. 384-389.

Qiu et al., "Resistance Spot Welding between Aluminum Alloy and Low-Carbon Steel," Advanced Materials Research, vols. 189-193 (2011) pp. 3534-3540.

Qui et al., "Interfacial microstructure and strength of steel/aluminum alloy joints welded by resistance spot welding with cover plate," Journal of Materials Processing Technology, 209 (2009) pp. 4186-4193.

Ueda et al., "Effects of Zn-Based Alloys Coating on Mechanical Properties and Interfacial Microstructures of Steel/Aluminum Alloy Dissimilar Metals Joints Using Resistance Spot Welding," Materials Transactions, vol. 52 (Apr. 2011) No. 5 pp. 967-973.

* cited by examiner

METHOD OF RESISTANCE SPOT WELDING ALUMINUM TO STEEL

CROSS-REFERENCE TO RELATED APPLICATION(S)

This application claims the benefit of U.S. Provisional Application Nos. 62/320,081 and 62/320,163, each of which was filed on Apr. 8, 2016. The entire contents of each of the aforementioned provisional applications are incorporated herein by reference.

TECHNICAL FIELD

The technical field of this disclosure relates generally to a method of resistance spot welding a workpiece stack-up that includes an aluminum workpiece and an adjacent overlapping steel workpiece.

INTRODUCTION

Resistance spot welding is a process used by a number of industries to join together two or more metal workpieces. The automotive industry, for example, often uses resistance spot welding to join together metal workpieces during the manufacture of structural frame members (e.g., body sides and cross members) and vehicle closure members (e.g., vehicle doors, hoods, trunk lids, and lift gates), among others. A number of spot welds are often formed at various points around a peripheral edge of the metal workpieces or some other bonding region to ensure the part is structurally sound. While spot welding has typically been practiced to join together certain similarly composed metal workpieces—such as steel-to-steel and aluminum-to-aluminum—the desire to incorporate lighter weight materials into a vehicle body structure has generated interest in joining steel workpieces to aluminum workpieces by resistance spot welding. The aforementioned desire to resistance spot weld such dissimilar metal workpieces is not unique to the automotive industry; indeed, it extends to other industries including the aviation, maritime, railway, and building construction industries.

Resistance spot welding relies on the resistance to the flow of electrical current through overlapping metal workpieces and across their faying interface(s) to generate heat. To carry out such a welding process, a set of opposed welding electrodes is pressed in facial alignment against opposite sides of the workpiece stack-up, which typically includes two or three metal workpieces arranged in a lapped configuration. Electrical current is then passed through the metal workpieces from one welding electrode to the other. Resistance to the flow of this electrical current generates heat within the metal workpieces and at their faying interface(s). When the workpiece stack-up includes an aluminum workpiece and an adjacent overlapping steel workpiece, the heat generated at the faying interface and within the bulk material of those dissimilar metal workpieces initiates and grows a molten aluminum weld pool within the aluminum workpiece. The molten aluminum weld pool wets the adjacent faying surface of the steel workpiece and, upon termination of the current flow, solidifies into a weld joint that bonds the two workpieces together.

In practice, however, spot welding an aluminum workpiece to a steel workpiece is challenging since a number of characteristics of those two metals can adversely affect the strength—most notably the peel and cross tension strength—of the weld joint. For one, the aluminum workpiece usually contains a mechanically tough, electrically insulating, and self-healing refractory oxide surface layer. This oxide surface layer is typically comprised of aluminum oxide compounds, but may include other metal oxide compounds as well, including those of magnesium oxide when the aluminum workpiece is composed, for example, of a magnesium-containing aluminum alloy. As a result of its properties, the refractory oxide surface layer has a tendency to remain intact at the faying interface where it not only hinders the ability of the molten aluminum weld pool to wet the steel workpiece, but also provides a source of near-interface defects within the growing weld pool. Furthermore, the insulating nature of the oxide surface layer raises the electrical contact resistance of the aluminum workpiece—namely, at its faying surface and at its electrode contact point—making it difficult to effectively control and concentrate heat within the aluminum workpiece.

The complications attributed to the refractory oxide surface layer of the aluminum workpiece can be magnified when an intermediate organic material layer—such as an uncured yet heat-curable adhesive, a sealer, a sound-proofing layer, etc.—is present between the faying surfaces of the aluminum and steel workpieces at the faying interface. Specifically, it is believed that residuals from the organic material layer—which may include carbon ash, filler particles (e.g., silica, rubber, etc.), and other derivative materials—end up combining with a residual oxide film to form a more tenacious composite residue film that is more resistant to mechanical break down and dispersion during current flow as compared to the original refractory oxide surface layer. The formation of a tougher composite residue film results in fragments of that film remaining grouped and compiled at and along the faying interface in a much more disruptive manner as compared to instances in which an intermediate organic material layer is not present between the aluminum and steel workpieces. For instance, the composite residue film may block the diffusion of iron into the molten aluminum weld pool, which can result in excessive thickening of the hard and brittle Fe—Al intermetallic layer. Additionally, the composite residue film may provide a ready crack path along the bonding interface of the weld joint and the steel workpiece. Each of these incidents can weaken the weld joint.

Apart from the challenges presented by the refractory surface oxide layer of the aluminum workpiece, whether in conjunction with the intermediate organic material layer or not, the aluminum workpiece and the steel workpiece possess different properties that can adversely affect the strength and properties of the weld joint. Specifically, aluminum has a relatively low melting point (~600° C.) and relatively low electrical and thermal resistivities, while steel has a relatively high melting point (~1500° C.) and relatively high electrical and thermal resistivities. As a consequence of these differences in material properties, most of the heat is generated within the steel workpiece during current flow such that a heat imbalance exists between the steel workpiece (higher temperature) and the aluminum workpiece (lower temperature). The combination of the heat imbalance created during current flow and the high thermal conductivity of the aluminum workpiece means that, immediately after the electrical current flow is terminated, a situation occurs where heat is not disseminated symmetrically from the weld zone. Instead, heat is conducted from the hotter steel workpiece through the aluminum workpiece towards the welding electrode on the other side of the aluminum workpiece, which creates a steep thermal gradient in that direction.

The development of a steep thermal gradient between the steel workpiece and the welding electrode on the other side of the aluminum workpiece is believed to weaken the resultant weld joint in several ways. First, because the steel workpiece retains heat for a longer duration than the aluminum workpiece after the flow of electrical current has terminated, the molten aluminum weld pool solidifies directionally, starting from the region proximate the colder welding electrode (often water cooled) associated with the aluminum workpiece and propagating towards the faying surface of the steel workpiece. A solidification front of this kind tends to sweep or drive defects—such as gas porosity, shrinkage voids, and micro-cracking—towards and along the bonding interface of the weld joint and the steel workpiece where residual oxide film defects or composite residue film defects are already present. Second, the sustained elevated temperature in the steel workpiece promotes the growth of a hard and brittle Fe—Al intermetallic layer within the weld joint and contiguous with the faying surface of the steel workpiece. Having a dispersion of weld defects together with excessive growth of the Fe—Al intermetallic layer at the bonding interface tends to reduce the peel and cross-tension strength of the weld joint.

In light of the aforementioned challenges, previous efforts to spot weld an aluminum workpiece and a steel workpiece have employed a weld schedule that specifies higher currents, longer weld times, or both (as compared to spot welding steel-to-steel), in order to try and obtain a reasonable weld bond area. Such efforts have been largely unsuccessful in a manufacturing setting and have a tendency to damage the welding electrodes. Given that previous spot welding efforts have not been particularly successful, mechanical fasteners including self-piercing rivets and flow-drill screws have predominantly been used instead. Mechanical fasteners, however, take longer to put in place and have high consumable costs compared to spot welding. They also add weight to the vehicle—weight that is avoided when joining is accomplished by way of spot welding—that offsets some of the weight savings attained through the use of an aluminum workpiece in the first place. Advancements in spot welding that make it easier to join aluminum and steel workpieces would thus be a welcome addition to the art.

SUMMARY

A method of resistance spot welding together a workpiece stack-up that includes an aluminum workpiece and an adjacent overlapping steel workpiece may include several steps. To begin, a source of a reactive metal in a diffusible state is located along a faying interface of an aluminum workpiece and an adjacent overlapping steel workpiece. The reactive metal is able to react with molten aluminum to form metal aluminide particles. Next, a weld face of a first welding electrode is pressed against an aluminum workpiece surface that provides a first side of the workpiece stack-up, and a weld face of a second welding electrode is pressed against a steel workpiece surface that provides a second side of the workpiece stack-up. Once the welding electrodes are in place, an electrical current is passed through the workpiece stack-up between the weld faces of the opposed first and second welding electrodes at a weld zone. This causes the aluminum workpiece that lies adjacent to the steel workpiece to melt and create a molten aluminum weld pool within the aluminum workpiece that wets a faying surface of the adjacent steel workpiece. The contact between the molten aluminum weld pool and the source of the reactive metal in a diffusible state results in the formation of metal aluminide particles that migrate into the molten aluminum weld pool. Eventually, after some suitable time period, the passage of the electrical current between the weld faces of the opposed first and second welding electrodes is terminated to allow the molten aluminum weld pool to solidify into a weld joint.

The method of resistance spot welding together an aluminum workpiece and a steel workpiece may have additional or more-defined steps. For instance, in one embodiment of the disclosed method, the source of a reactive metal in a diffusible state may be a composite adhesive layer disposed at the faying interface of the aluminum and steel workpieces between a faying surface of the aluminum workpiece and the faying surface of the steel workpiece. The composite adhesive layer may comprise a structural thermosetting adhesive matrix and reactive particles dispersed within the matrix. The reactive particles, moreover, may comprise a base metal element and one or more reactive constituent metal elements alloyed with the base metal element in a diffusible state. For example, the one or more reactive constituent metal elements of the reactive particles may include one or more of iron, nickel, cobalt, or manganese. As another example, the one or more reactive constituent metal elements may result in aluminide particles being formed within the molten aluminum weld pool that include between 20 at % and 80 at % aluminum along with at least one of Fe, Ni, Co, Mn, or a combination thereof.

In another embodiment of the disclosed method, the source of a reactive metal in a diffusible state may be a reactive alloy layer that confronts and is in proximate contact with a faying surface of the aluminum workpiece. The reactive alloy layer may comprise a base metal element and one or more reactive constituent metal elements alloyed with the base metal element in a diffusible state. Indeed, in one specific implementation, the reactive alloy layer may be a reactive alloy surface layer that is part of the steel workpiece in that the reactive alloy surface layer is adhered to a base steel substrate of the steel workpiece. Such a layer may have a thickness between 2 μm and 100 μm. For example, the reactive alloy surface layer may be a galvanneal zinc-iron alloy layer, an electrodeposited zinc-nickel alloy layer, or an electrodeposited zinc-iron alloy layer. Additionally, in some practices, the reactive alloy surface layer of the steel workpiece may make proximate contact with the faying surface of the aluminum workpiece through an intervening organic material layer situated between the aluminum and steel workpieces at the faying interface.

Regardless of the source of the reactive metal in a diffusible state, the disclosed method may be carried out when the workpiece stack-up is assembled with two or more workpieces. To be sure, when the workpiece stack-up is assembled into a "2T" stack-up, the aluminum workpiece constitutes the aluminum workpiece surface that provides the first side of the workpiece stack-up and the steel workpiece that lies adjacent to the aluminum workpiece constitutes the steel workpiece surface that provides the second side of the workpiece stack-up. Additional aluminum and/or steel workpieces may be included in the workpiece stack-up if desired to produce stack-ups that include three and possibly four workpieces. The disclosed method may also be practiced such that the metal aluminide particles that migrate into the molten aluminum weld pool end up settling into an annular ring of metal aluminide particles in the weld joint. The annular ring of metal aluminide particles may extend upwardly from a weld bond surface of the weld joint and radially inwardly into an aluminum weld nugget of the weld joint.

DETAILED DESCRIPTION

Figure 1:
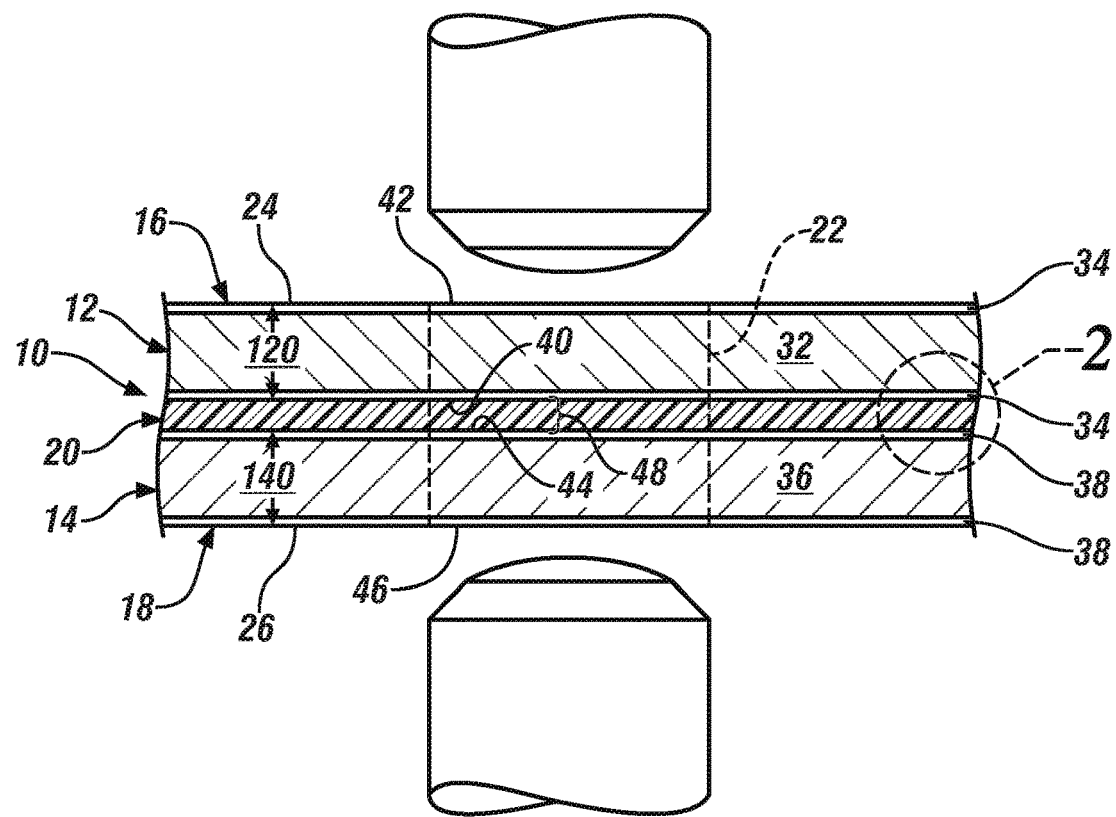
FIG. 1 is a cross-sectional illustration of a workpiece stack-up in preparation for resistance spot welding according to one embodiment of the disclosed method in which the stack-up includes overlapping aluminum and steel workpieces along with a composite adhesive layer disposed between faying surfaces of the two workpieces.

Spot welding an aluminum workpiece to a steel workpiece presents some notable challenges. As discussed above, many of the identified challenges that complicate the ability to spot weld those dissimilar metals relates to the susceptibility of the weld joint to being compromised at the interface of the joint and the faying surface of the steel workpiece due to weld disparities and the presence of a hard and brittle intermetallic layer. These challenges are particularly problematic when an intermediate organic material is present between the two workpieces at the faying interface due to the fact that, during welding, the organic material can interact with a residual oxide film to form a more mechanically tough composite residue film. As a result, the application of conventional steel-to-steel or aluminum-to-aluminum spot welding practices to a workpiece stack-up that includes a lapped configuration of aluminum and steel workpieces has a tendency to produce a weld joint between the aluminum and steel workpieces that exhibits unsatisfactory interfacial joint fracture when subjected to loading during standard peel or cross tension tests.

A resistance spot welding method is disclosed herein that addresses the various challenges that underlie the spot welding of an aluminum workpiece and an adjacent steel workpiece. The method involves locating a source of a reactive metal in a diffusible state along the faying interface of the aluminum and steel workpieces at least through the weld zone, which means the source of a diffusible reactive metal may be included in a surface coating of the aluminum workpiece, a surface coating of the steel workpiece, or as dispersed particles within an intermediate organic material layer disposed between the aluminum and steel workpieces. The reactive metal is any metal that can migrate into the molten aluminum weld pool created during spot welding and react with the molten aluminum to form metal aluminide particles. To that end, a source of a diffusible reactive metal refers to any material that contains dilute and weakly bound reactive metal such that it can be easily released from its source for migration into the molten aluminum weld pool. Sources in which the reactive metal is more tightly bound will not release the reactive metal into the molten aluminum weld pool. And sources with high concentrations of the reactive metal are likely to form a contiguous aluminide layer at the surface of the molten aluminum weld pool that prematurely terminates or otherwise blocks migration of the reactive metal into the weld pool.

The source of a reactive metal in a diffusible state may be in the form of reactive metal alloy particles. In particular, as shown in FIGS. 1-16 and described in more detail below, one embodiment of the disclosed method employs an intermediate composite adhesive layer between opposed faying surfaces of the aluminum and steel workpieces. The composite adhesive layer includes reactive particles capable of forming high-melting temperature aluminide particles when the aluminum workpiece is melted during passage of an electrical current through the stacked workpieces and the reactive particles are exposed to, and react with, the resultant molten aluminum weld pool created within the aluminum workpiece. The reactive particles can accommodate the formation of the high-melting temperature aluminide particles by containing one or more reactive constituent metal elements, such as iron or nickel, that are alloyed with a base carrier metal element while remaining in a diffusible state.

The high-melting temperature aluminide particles produced by the reaction between the reactive particles and the molten aluminum weld pool exhibit mobility into and within the weld pool in a way that enhances the strength characteristics of the ultimately-formed weld joint. This joint-strengthening effect occurs because the high-temperature aluminide particles migrate into the molten aluminum weld pool and, in doing so, lift and carry oxide material fragments and composite layer residue fragments (if present) upwards into the weld pool to keep those fragments from settling against the steel workpiece. The high-melting temperature aluminide particles may also arrange themselves into an annular ring that protects a bonding interface between the weld joint and the adjoining faying surface of the steel workpiece from crack propagation under an applied load. The afforded protection against crack propagation is noteworthy since oftentimes the primary cause of interfacial joint failure under an applied load is rapid crack growth through the intermetallic layer as aided by near-interface weld disparities.

Figure 2:
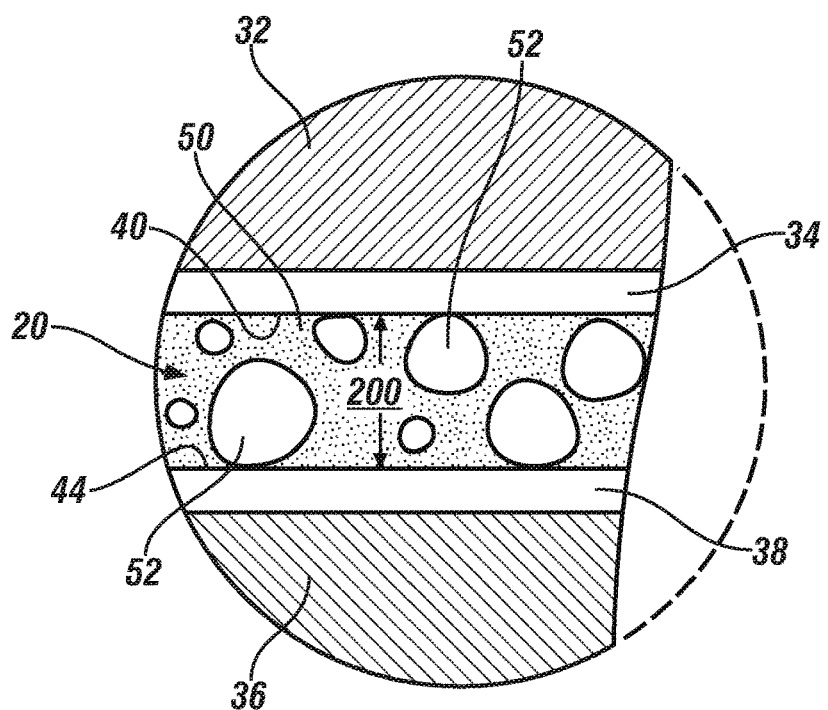
FIG. 2 is a magnified cross-sectional view of the composite adhesive layer illustrating a structural thermosetting adhesive matrix and reactive particles dispersed within the matrix.
Figure 3:
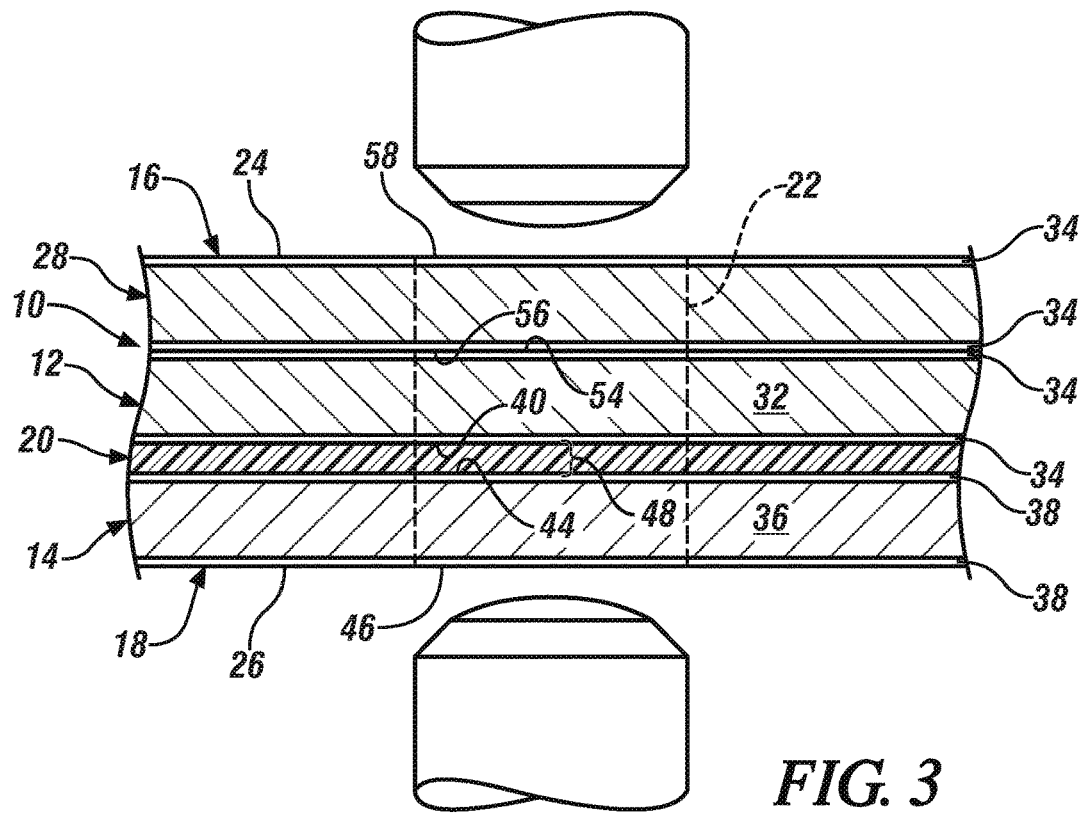
FIG. 3 is a cross-sectional illustration of another implementation of a workpiece stack-up in preparation for resistance spot welding in which the stack-up includes overlapping aluminum and steel workpieces along with a composite adhesive layer disposed between the faying surfaces of the two workpieces, wherein here the workpiece stack-up includes an additional aluminum workpiece.
Figure 4:
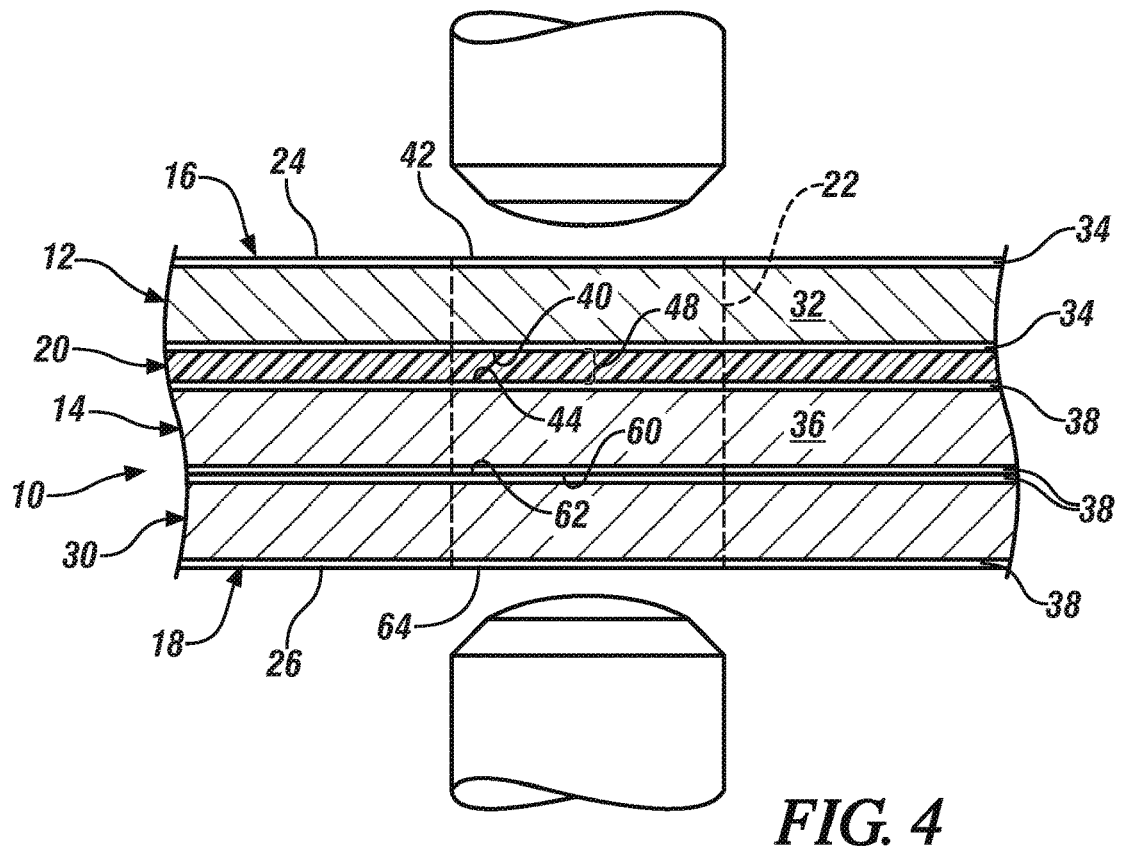
FIG. 4 is a cross-sectional illustration of another implementation of a workpiece stack-up in preparation for resistance spot welding in which the stack-up includes overlapping aluminum and steel workpieces along with a composite adhesive layer disposed between the faying surfaces of the two workpieces, wherein here the workpiece stack-up includes an additional steel workpiece.

The disclosed method of resistance spot welding a workpiece stack-up 10 that includes an aluminum workpiece 12 and an adjacent overlapping steel workpiece 14 is illustrated generally in FIGS. 1-4. Referring for the moment to FIGS. 1-2, the workpiece stack-up 10 has a first side 16 and a second side 18 and includes at least the aluminum workpiece 12 and the steel workpiece 14 which, as shown, overlap with and lie adjacent to one another through a weld zone 22 while being separated by an intervening composite adhesive layer 20. The first side 16 of the workpiece stack-up 10 is provided by an aluminum workpiece surface 24 and the second side 18 is provided by steel workpiece surface 26. The workpiece stack-up 10 may thus be assembled as a "2T" stack-up that includes only the adjacent pair of aluminum and steel workpieces 12, 14, or it may be assembled as a "3T" stack-up that includes the adjacent aluminum and steel workpieces 12, 14 plus an additional aluminum workpiece 28 (aluminum-aluminum-steel as shown in FIG. 3) or an additional steel workpiece 30 (aluminum-steel-steel as shown in FIG. 4) so long as the two workpieces of the same base metal composition are disposed next to each other. The workpiece stack-up 10 may even include more than three workpieces such as an aluminum-aluminum-steel-steel stack-up, an aluminum-aluminum-aluminum-steel stack-up, or an aluminum-steel-steel-steel stack-up.

The aluminum workpiece 12 includes an aluminum substrate 32 that is either coated or uncoated. The aluminum substrate 32 may be composed of unalloyed aluminum or an aluminum alloy that includes at least 85 wt % aluminum. Some notable aluminum alloys that may constitute the aluminum substrate 32 are an aluminum-magnesium alloy, an aluminum-silicon alloy, an aluminum-magnesium-silicon alloy, or an aluminum-zinc alloy. If coated, the aluminum substrate 32 includes a surface layer 34 that may be a native refractory oxide material composed of aluminum oxide compounds and possibly other oxide compounds as well and/or an oxide layer created during exposure of the aluminum substrate 32 to elevated temperatures during manufacture, e.g., a mill scale. The surface layer 34 in this instance preferably has a thickness ranging from 1 nm to 20 nm and may be present on one side or both sides (as shown) of the aluminum substrate 32. Taking into account the thickness of the aluminum substrate 32 and the optional surface layer 34 that may be present, the aluminum workpiece 12 has a thickness 120 that ranges from 0.3 mm to about 6.0 mm, or more narrowly from 0.5 mm to 3.0 mm, at least at the weld zone 22.

The aluminum substrate 32 of the aluminum workpiece 12 may be provided in wrought or cast form. For example, the aluminum substrate 32 may be composed of a 4xxx, 5xxx, 6xxx, or 7xxx series wrought aluminum alloy sheet layer, extrusion, forging, or other worked article. Alternatively, the aluminum substrate 32 may be composed of a 4xx.x, 5xx.x, 6xx.x, or 7xx.x series aluminum alloy casting. Some more specific kinds of aluminum alloys that may constitute the aluminum substrate 32 include, but are not limited to, AA5754 and AA5182 aluminum-magnesium alloy, AA6111 and AA6022 aluminum-magnesium-silicon alloy, AA7003 and AA7055 aluminum-zinc alloy, and Al-10Si-Mg aluminum die casting alloy. The aluminum substrate 32 may further be employed in a variety of tempers including annealed (O), strain hardened (H), and solution heat treated (T), if desired. The term "aluminum workpiece" as used herein thus encompasses unalloyed aluminum and a wide variety of aluminum alloys, whether coated or uncoated, in different spot-weldable forms including wrought sheet layers, extrusions, forgings, etc., as well as castings.

The steel workpiece 14 includes a steel substrate 36 of any of a wide variety of grades and strengths including those that are cold-rolled or hot-rolled. The steel substrate 36, for example, may be composed of mild steel, interstitial-free steel, bake-hardenable steel, high-strength low-alloy (HSLA) steel, dual-phase (DP) steel, complex-phase (CP) steel, martensitic (MART) steel, transformation induced plasticity (TRIP) steel, twining induced plasticity (TWIP) steel, and boron steel such as when the steel workpiece 14 includes press-hardened steel (PHS), to name but a few examples. Preferred compositions of the steel substrate 36, however, include mild steel, dual phase steel, and boron steel used in the manufacture of press-hardened steel. Those three types of steel have ultimate tensile strengths that, respectively, range from 150 MPa to 350 MPa, from 500 MPa to 1100 MPa, and from 1200 MPa to 1800 MPa.

The steel workpiece 14, moreover, may include a surface layer 38 on one side or both sides (as shown) of the steel substrate 36. In present, the surface layer 38 that overlies the steel substrate 36 may be any of a wide variety of suitable coating compositions. For example, the surface layer 38 may be composed of zinc (galvanized), nickel, a zinc-iron alloy (galvanneal), a zinc-nickel alloy, aluminum, an aluminum-magnesium alloy, an aluminum-zinc alloy, or an aluminum-silicon alloy. The term "steel workpiece" thus encompasses a wide variety of steel substrates, whether coated or uncoated, of different grades and strengths, and further includes those that have undergone pre-welding treatments like annealing, quenching, and/or tempering such as in the production of press-hardened steel. Taking into account the thickness of the steel substrate 36 and the optional surface layer 38 that may be present, the steel workpiece 14 has a thickness 140 that ranges from 0.3 mm and 6.0 mm, or more narrowly from 0.6 mm to 2.5 mm, at least at the weld zone 22.

The aluminum workpiece surface 24 and the steel workpiece surface 26 that provide the first and second sides 16, 18 of the workpiece stack-up 10 may be presented by the adjacent and overlapping aluminum and steel workpieces 12, 14 when the stack-up 10 is assembled as a "2T" stack-up. For example, when the two workpieces 12, 14 are stacked-up for spot welding in the context of the embodiment shown in FIGS. 1-2, the aluminum workpiece 12 includes a faying surface 40 and a back surface 42 and, likewise, the steel workpiece 14 includes a faying surface 44 and back surface 46. The faying surfaces 40, 44 of the two workpieces 12, 14 overlap and confront one another through the composite adhesive layer 20 to establish a faying interface 48 within the weld zone 22. The back surfaces 42, 46 of the aluminum and steel workpieces 12, 14, on the other hand, face away from one another in opposite directions at the weld zone 22 and constitute the aluminum and steel workpiece surfaces 24, 26, respectively, of the stack-up 10.

The term "faying interface 48" is used broadly in the present disclosure and encompasses any overlapping and confronting relationship between the faying surfaces 40, 44 in which resistance spot welding can be practiced including various forms of direct and/or indirect contact. Indeed, as shown here in FIGS. 1-2, the faying surfaces 40, 44 of the aluminum and steel workpieces 12, 14 may be in indirect contact prior to current flow and the creation of the molten aluminum weld pool. The faying surfaces 40, 44 are in indirect contact at the weld zone 22 when they are not indirect interfacial contact with one another but, nevertheless, are separated by an interface with opposite sides of the composite adhesive layer 20. The presence of the composite adhesive layer 20 between the faying surfaces 40, 44 can be spot welded through rather easily, as will be further described below, and thus does not detrimentally inhibit commutation of an electrical current between the surfaces 40, 44.

The composite adhesive layer 20 is disposed between the faying surfaces 40, 44 of the adjacent aluminum and steel workpieces 12, 14 and includes a structural thermosetting adhesive matrix 50 and reactive particles 52 dispersed within the matrix 50. This is shown best in the partial magnified illustration of FIG. 2. The structural thermosetting adhesive matrix 50 may be any curable structural adhesive including, for example, a heat-curable epoxy or a heat curable polyurethane. Some specific examples of heat-curable structural adhesives that may be used as the adhesive matrix 50 include DOW Betamate 1486, Henkel Terokal 5089, and Uniseal 2343, all of which are commercially available. Additionally, while not shown in FIG. 2, the composite adhesive layer 20 may further include optional filler particles, such as silica particles, dispersed throughout the adhesive matrix 50 to modify the viscosity profile or other properties of the composite adhesive for manufacturing operations. The intervening composite adhesive layer 20 preferably has a thickness 200 through the weld zone 22 that ranges from 0.1 mm to 2.0 mm or, more narrowly, from 0.2 mm to 1.0 mm.

The reactive particles 52 dispersed within the structural thermosetting adhesive matrix 50 are metal alloy particles that constitute the source of diffusible reactive metal. The reactive particles 52 include a base metal element and one or more reactive constituent metal elements alloyed with the base metal element in a diffusible state. The base metal element is preferably zinc or some other metal element that is readily soluble in the molten aluminum weld pool formed during spot welding. Each of the one or more reactive constituent metal elements may be any metal element that can react with molten aluminum in the weld pool to form high-melting temperature aluminide particles. Preferred reactive constituent metal elements that can react in this way include at least one of the following: (1) iron (Fe), (2) nickel (Ni), (3) cobalt (Co), or (4) manganese (Mn). Several examples of suitable reactive particles 52 include Zn—Fe alloy particles, Zn—Ni alloy particles, Zn—Fe—Ni alloy particles, Zn—Co alloy particles, Zn—Fe—Mn alloy particles, and Zn—Ni—Mn alloy particles, with Zn—Fe alloy and Zn—Ni alloy particles being most preferred. The reactive particles 52 may be sized to have an average diameter that ranges from 0.01 mm to 2.0 mm or, more narrowly, from 0.2 mm to 1.0 mm.

The one or more reactive constituent metal elements are alloyed with the base metal element in a diffusible state when they can be easily released from the base metal element for migration into the molten aluminum weld pool. Such a diffusible state can be accomplished when the one or more reactive constituent metal elements are weakly bound and sufficiently diluted or dispersed within the base metal element. Indeed, a base metal element that binds the one or more reactive constituent metal elements too strongly will release only a negligible proportion of the constituent metal element(s) into the molten aluminum weld pool, while reactive particles 52 that have too high of a concentration of reactive constituent metal element(s) are likely to produce a contiguous aluminide layer at the surface of the molten aluminum weld pool that prematurely terminates or otherwise blocks the migration of the reactive constituent metal element(s) into the weld pool. A diffusible state of the one or more constituent metal elements can typically be attained when the base metal element is zinc and the reactive particles 52 contain a total of up to 35 at %, or more preferably between 10 at % and 25 at %, of the one or more constituent metal elements.

The composite adhesive layer 20 disposed between the faying surfaces 40, 44 of the aluminum and steel workpieces 12, 14 is multifunctional. Within the weld zone 22, the composite adhesive layer 20 exposes the molten aluminum weld pool created during current flow to the reactive particles 52 which, in turn, facilitates migration of the reactive constituent metal elements into the weld pool where they ultimately react with molten aluminum to form the high-melting temperature aluminide particles, as described in greater detail below. The high-melting temperature aluminide particles derived from the reactive particles 52 in the composite adhesive layer 20 are able to carry residual oxide film fragments and composite residue film fragments up into the molten aluminum weld pool and away from the steel workpiece 14. They also have a tendency to congregate into an annular ring that protects the weld joint against interfacial crack propagation. Outside of the weld zone 22, the composite adhesive layer 20 remains generally undisturbed and can provide additional bonding between the faying surfaces 40, 44 of the aluminum and steel workpieces 12, 14 when, following spot welding, the workpiece stack-up 10 is heated in an ELPO-bake oven or other apparatus to cure the structural thermosetting adhesive matrix 50.

Of course, as shown in FIGS. 3-4, the workpiece stack-up 10 is not limited to the inclusion of only the aluminum workpiece 12 and the adjacent steel workpiece 14. The workpiece stack-up 10 may also be assembled to include the additional aluminum workpiece 28 or the additional steel workpiece 30—in addition to the adjacent aluminum and steel workpieces 12, 14—so long as the additional workpiece is disposed adjacent to the workpiece 12, 14 of the same base metal composition; that is, the additional aluminum workpiece 28 is disposed adjacent to the aluminum workpiece 12 and the additional steel workpiece 30 is disposed adjacent to the steel workpiece 14. As for the characteristics of the additional workpiece, the descriptions of the aluminum workpiece 12 and the steel workpiece 14 provided above are applicable to the additional aluminum workpiece 28 or the additional steel workpiece 30 that may be included in the workpiece stack-up 10. It should be noted, though, that while the same general descriptions apply, there is no requirement that the two aluminum workpieces 12, 28 or the two steel workpieces 14, 30 of a 3T stack-up be identical in terms of composition, thickness, or form (e.g., wrought or cast).

As shown in FIG. 3, for example, the workpiece stack-up 10 may include the adjacent aluminum and steel workpieces 12, 14 described above along with the additional aluminum workpiece 28 that overlaps and lies adjacent to the aluminum workpiece 12. When the additional aluminum workpiece 28 is so positioned, the back surface 46 of the steel workpiece 14 constitutes the steel workpiece surface 26 that provides the second side 18 of the workpiece stack-up 10, as before, while the aluminum workpiece 12 that lies adjacent to the steel workpiece 14 now includes a pair of opposed faying surfaces 40, 54. The faying surface 40 of the aluminum workpiece 12 that faces the steel workpiece 14 continues to establish the faying interface 48 through the composite adhesive layer 20 along with the confronting faying surface 44 of the steel workpiece 14 as previously described. The other faying surface 54 of the aluminum workpiece 12 overlaps and confronts a faying surface 56 of the additional aluminum workpiece 28. As such, in this particular arrangement of lapped workpieces 28, 12, 14, a back surface 58 of the additional aluminum workpiece 28 now constitutes the aluminum workpiece surface 24 that provides the first side 16 of the workpiece stack-up 10.

In another example, as shown in FIG. 4, the workpiece stack-up 10 may include the adjacent aluminum and steel workpieces 12, 14 described above along with the additional steel workpiece 30 that overlaps and is disposed adjacent to the steel workpiece 14. When the additional steel workpiece 30 is so positioned, the back surface 42 of the aluminum workpiece 12 constitutes the aluminum workpiece surface 24 that provides the first side 16 of the workpiece stack-up 10, as before, while the steel workpiece 14 that lies adjacent to the aluminum workpiece 12 now includes a pair of opposed faying surfaces 44, 60. The faying surface 44 of the steel workpiece 14 that faces the aluminum workpiece 12 continues to establish the faying interface 48 along with the confronting faying surface 40 of the aluminum workpiece 12, as previously described. The other faying surface 60 of the steel workpiece 14 overlaps and confronts a faying surface 62 of the additional steel workpiece 30. As such, in this particular arrangement of lapped workpieces 12, 14, 30, a back surface 64 of the additional steel workpiece 30 now constitutes the steel workpiece surface 26 that provides the second side 18 of the workpiece stack-up 10.

Figure 5:
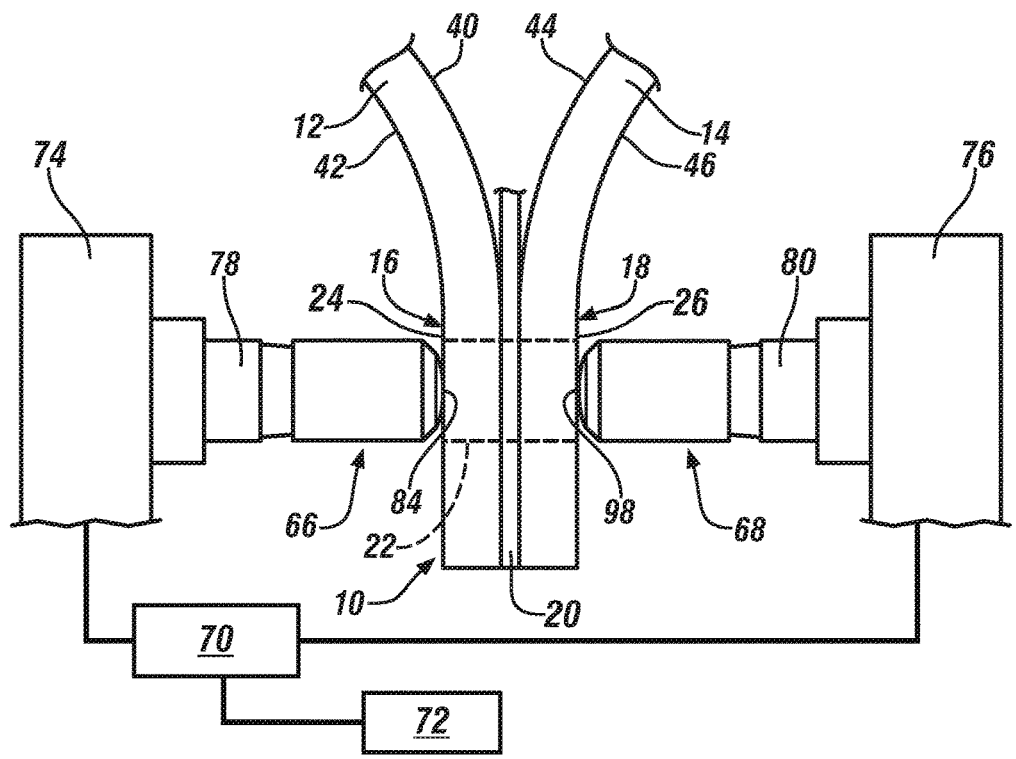
FIG. 5 is a general cross-sectional view of a workpiece stack-up, which includes overlapping aluminum and steel workpieces along with a composite adhesive layer disposed between the faying surfaces of the two workpieces, situated between a set of opposed welding electrodes in preparation for resistance spot welding.

Turning now to FIG. 5, the workpiece stack-up 10 is shown after being assembled in an overlapping configuration along with a first welding electrode 66 and a second welding electrode 68 of a larger resistance spot weld gun (partially depicted). Each of the first and second welding electrodes 66, 68 are carried by the weld gun, which may be of any suitable type including, for example, a C-type or a X-type weld gun. Additionally, as illustrated schematically here, the welding electrodes 66, 68 are electrically coupled to a power supply 70 capable of delivering electrical current between the welding electrodes 66, 68 and through the workpiece stack-up 10 according to a programmed weld schedule administered by a weld controller 72. The weld gun may also be fitted with coolant lines and associated control equipment in order to deliver a coolant fluid, such as water, to each of the welding electrodes 66, 68 during spot welding operations.

The weld gun includes a first gun arm 74 and a second gun arm 76. The first gun arm 74 is fitted with a shank 78 that secures and retains the first welding electrode 66 and the second gun arm 76 is fitted with a shank 80 that secures and retains the second welding electrode 68. The secured retention of the welding electrodes 66, 68 on their respective shanks 78, 80 can be accomplished by way of shank adapters that are located at axial free ends of the shanks 78, 80 and received by the electrodes 66, 68 in known fashion. The first and second weld gun arms 74, 76 are operable to converge or pinch the welding electrodes 66, 68 towards each other and to impose a clamping force on the workpiece stack-up 10 at the weld zone 22 once the electrodes 66, 68 are brought into contact with the stack-up 10. The converging and diverging movements of the gun arms 74, 76 are typically actuated by a servo-motor as instructed by a gun control (neither shown) although, in other embodiments, the gun arms 74, 76 may be pneumatically actuated.

Figure 6:
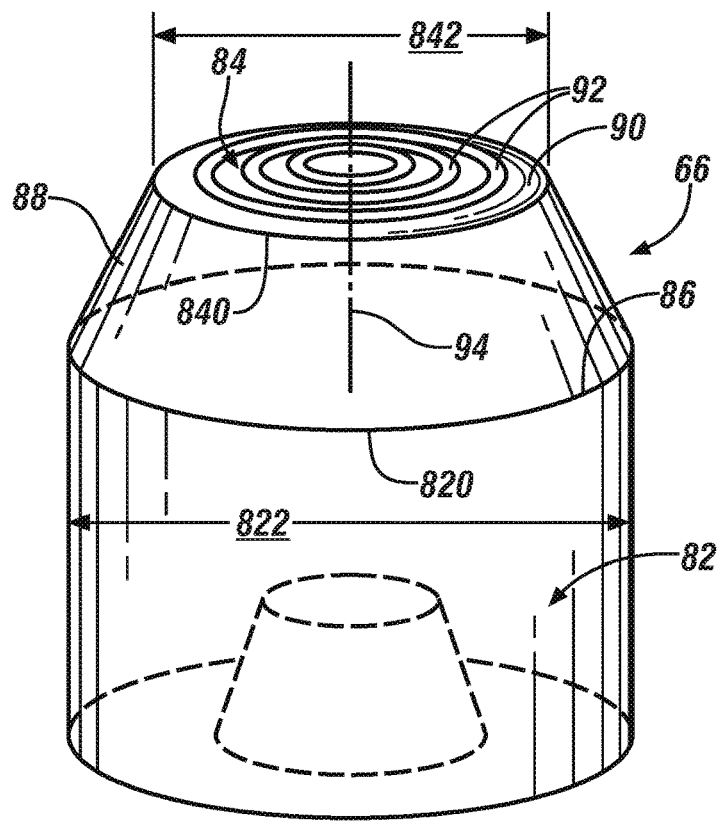
FIG. 6 is a general perspective view of a welding electrode that may be pressed against an aluminum workpiece surface of the workpiece stack-up during resistance spot welding of the stack-up according to one embodiment of the disclosure.
Figure 7:
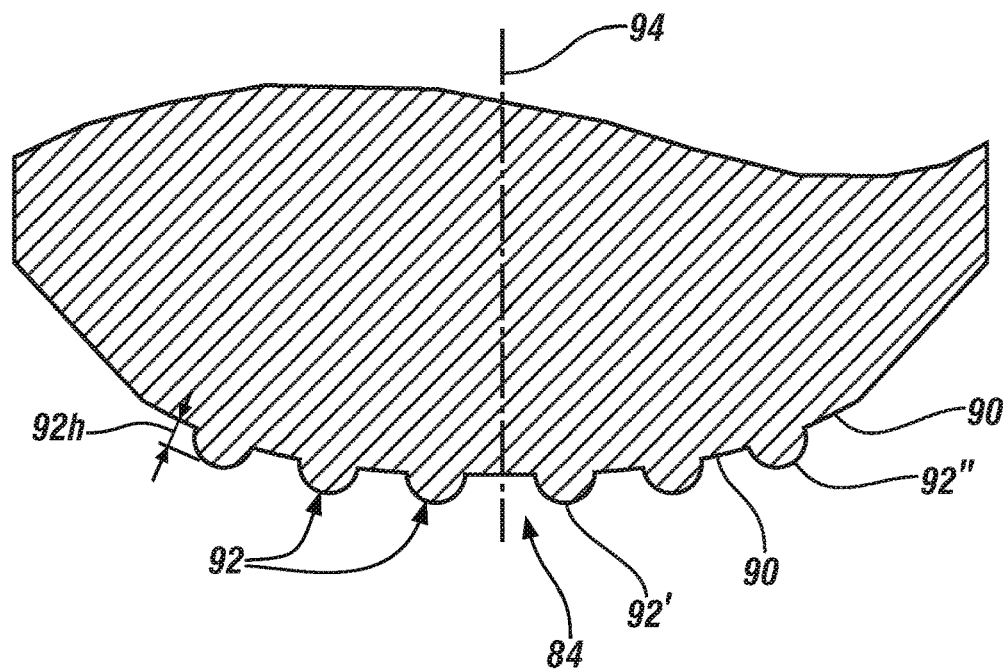
FIG. 7 is a magnified cross-sectional view of the weld face of the welding electrode depicted in FIG. 6.
Figure 8:
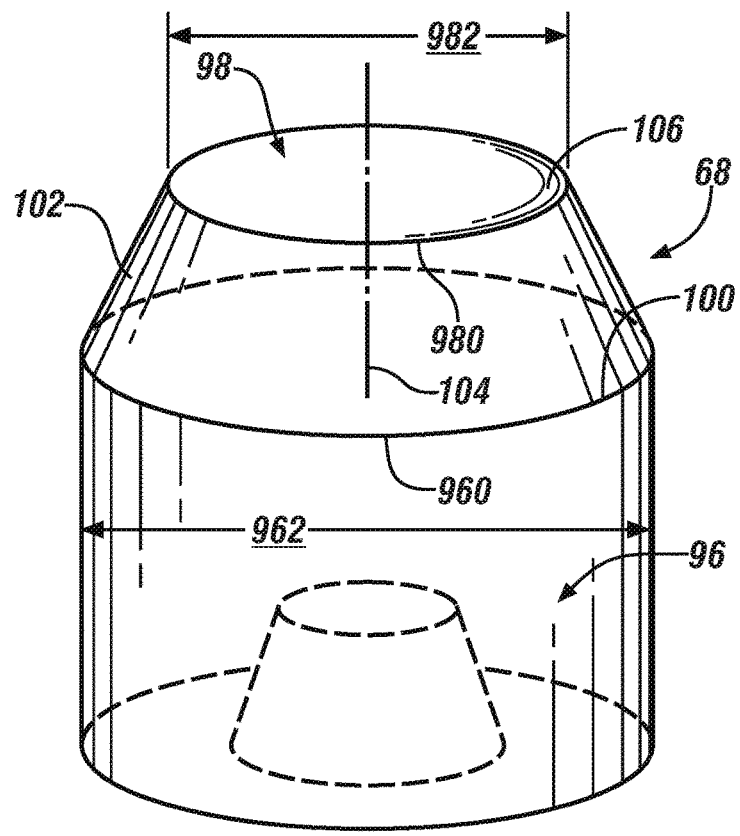
FIG. 8 is a general perspective view of a welding electrode that may be pressed against a steel workpiece surface of the workpiece stack-up during resistance spot welding of the stack-up according to one embodiment of the disclosure.

The first and second welding electrodes 66, 68 may be constructed in any way that facilitates passage of an electrical current (constant, pulsed, etc.) through the workpiece stack-up 10 at the weld zone 22. In a preferred embodiment, however, as shown in FIGS. 6-8, the first and second welding electrodes 66, 68 are asymmetric in construction in order to account for the materially different physical properties (e.g., melting point, thermal conductivity, electrical conductivity, strength at elevated temperatures, etc.) of the aluminum and steel workpieces 12, 14. In particular, the first welding electrode 66 is designed to break down the refractory oxide material on the aluminum workpiece 12, if present, and to contain the molten aluminum weld pool that grows within the aluminum workpiece 12. The second welding electrode 68, on the other hand, is designed to concentrate current within the steel workpiece 14 (relative to the aluminum workpiece 12) and to also cause some deformation of the steel workpiece 14 during electrical current flow. This takes advantage of the low conductivity—both thermally and electrically—of the steel workpiece 14 as well as its elevated melting point relative to the aluminum workpiece 12. Other welding electrode combinations may of course be used in alternative embodiments including, for instance, the use of symmetric welding electrodes each having the structure shown in FIGS. 6-7 and described below.

The first welding electrode 66 is illustrated in FIGS. 6-7 and includes an electrode body 82 and a weld face 84. The electrode body 82 is preferably cylindrical in shape and includes a front end 86 having a circumference 820. A diameter 822 of the body 82 taken at its front end circumference 820 preferably lies within the range of 12 mm to 22 mm or, more narrowly, within the range of 16 mm to 20 mm. The weld face 84 is disposed on the front end 86 of the body 82 and has a circumference 840 that is coincident with the circumference 820 of the front end 86 of the body 82 (a "full face electrode") or is upwardly displaced from the circumference 820 of the front end 86, to a distance between 2 mm and 10 mm, by a transition nose 88 of frustoconical or truncated spherical shape. If the transition nose 88 is frustoconical, the angle of truncation is preferably between 30° and 60° from a horizontal plane of the weld face circumference 840. If the transition nose 88 is spherical, the radius of curvature of the transition nose 88 is preferably between 6 mm and 12 mm.

The weld face 84 of the first welding electrode preferably has a diameter 842 measured at its circumference 840 that lies within the range of 6 mm to 22 mm or, more narrowly, within the range of 8 mm to 15 mm. In terms of its shape, the weld face 84 includes a base weld face surface 90 that is convexly domed. As such, the base weld face surface 90 ascends from the circumference 840 of the weld face 840. In one embodiment, the base weld face surface 90 may be spherically shaped with a radius of curvature that lies within the range of 15 mm to 300 mm or, more narrowly, within the range of 20 mm to 50 mm. Moreover, the weld face 84 includes a series of upstanding circular ridges 92 that project outwardly from the base weld face surface 90. These circular ridges 92 enable the first welding electrode 66 to establish good mechanical and electrical contact with the aluminum workpiece surface 24 by stressing and fracturing, if present, the mechanically tough and electrically insulating refractory oxide layer that typically coats the aluminum substrate 32.

The series of upstanding circular ridges 92 are preferably centered about and surround an axis 94 of the weld face 84. The base weld face surface 90 from which the ridges 92 project may account for 50% or more, and preferably between 50% and 80%, of the surface area of the weld face 84. The remaining surface area is attributed to the series of upstanding circular ridges 92, which preferably includes anywhere from two to ten ridges 92, or more narrowly from three to five ridges 92. The several upstanding circular ridges 92 are radially spaced apart from each other by annular portions of the base weld face surface 90 such that the upstanding ridges 92 become larger in diameter when moving from an innermost upstanding ridge 92' that immediately surrounds the axis 94 of the weld face 84 to an outermost upstanding ridge 92" that is most proximate to the circumference 840 of the weld face 84.

The size and shape of the upstanding circular ridges 92 are subject to some variability. In one embodiment, as shown in FIGS. 6-7, each of the upstanding circular ridges 92 has a closed circumference, meaning the ridge 92 is continuously curved and its circumference is not interrupted, with a cross-sectional profile that lacks sharp corners and has a curved (as shown) or flat top surface. Moreover, each of the upstanding circular ridges 92 also has a ridge height 92h—taken at the midpoint of the ridge 92—that extends upwards from the base weld face surface 90 when viewed in cross-section. The ridge height 92h of each ridge 92 preferably ranges from 20 μm to 400 μm or, more narrowly, from 50 μm to 300 μm. The spacing of the ridges 92 as measured between the midpoints of two adjacent ridges 92 preferably ranges from 50 μm to 1800 μm or, more narrowly, from 80 μm to 1500 μm. Each of the upstanding circular ridges 92 is preferably semicircular, truncated semicircular, or triangular in cross-section.

The second welding electrode 68 is illustrated in FIG. 8 and includes an electrode body 96 and a weld face 98. The electrode body 96 is preferably cylindrical in shape and includes a front end 100 having a circumference 960. A diameter 962 of the body 96 at its front end circumference 960 preferably lies within the range of 12 mm to 22 mm or, more narrowly, within the range of 16 mm to 20 mm. The weld face 98 is disposed on the front end 100 of the body 96 and has a circumference 980 that is coincident with the circumference 960 of the front end 100 of the body 96 (a "full face electrode") or is upwardly displaced from the circumference 960 of the front end 100, to a distance between 2 mm and 10 mm, by a transition nose 102 of frustoconical or truncated spherical shape. If the transition nose 102 is frustoconical, the angle of truncation is preferably between 15° and 50° from a horizontal plane of the weld face circumference 980. If the transition nose 102 is spherical, the radius of curvature of the transition nose 102 is preferably between 6 mm and 20 mm or, more narrowly, between 8 mm and 12 mm.

The weld face 98 of the second welding electrode 68 has an axis 104 and a diameter 982 measured at its circumference 980 that preferably lies within the range of 3 mm to 16 mm or, more narrowly, within the range of 4 mm to 8 mm. In terms of its shape, the weld face 98 includes a base weld face surface 106 that may be planar or convexly domed. If convexly domed, the base weld face surface 106 ascends from the circumference 980 of the weld face 98. In one embodiment, the base weld face surface 106 may be spherically shaped with a radius of curvature that lies within the range of 25 mm to 400 mm or, more narrowly, within the range of 25 mm to 100 mm. The base weld face surface 106 is preferably smooth across the entire surface area of the weld face 98. Such a smooth base weld face surface 106 is not necessarily required, though, as the weld face 98 of the second welding electrode 68 may also include a series of upstanding circular ridges or other protruding or intruding surface features, if desired.

The first and second welding electrodes 66, 68 may be constructed from any electrically and thermally conductive material suitable for spot welding applications. For example, the first and second welding electrodes 66, 68 may be constructed from a copper alloy having an electrical conductivity of at least 70% IACS, or more preferably at least 90% IACS, and a thermal conductivity of at least 300 W/mK, or more preferably at least 350 W/mK. One specific example of a copper alloy that may be used for the first and second welding electrodes 66, 68 is a copper-zirconium alloy (CuZr) that contains 0.10 wt % to 0.20 wt % zirconium and the balance copper. Other copper alloy compositions, as well as other metal compositions not explicitly recited here, that possess suitable mechanical properties as well as electrical and thermal conductivity properties may also be employed. As an alternative example, for instance, the first welding electrode 66 and/or the second welding electrode 68 may be constructed from a copper-chromium alloy, a copper-chromium-zirconium alloy, copper with an aluminum oxide dispersion, or a tungsten-copper metal composite that contains between 50 wt % and 90 wt % of a tungsten particulate phase dispersed in copper matrix that constitutes the balance (between 50 wt % and 10 wt %).

Figure 9:
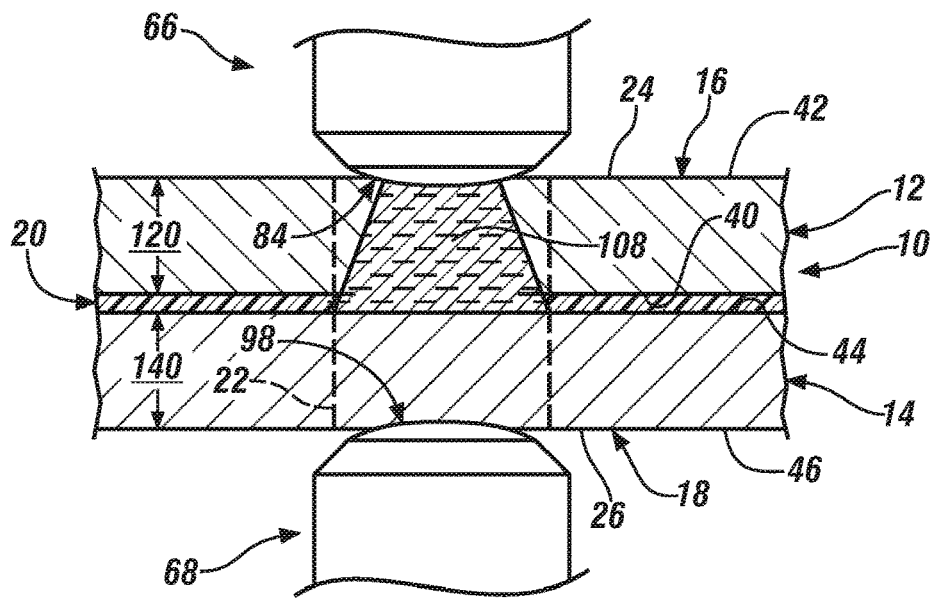
FIG. 9 is a general cross-sectional view of the workpiece stack-up and welding electrodes shown in FIG. 5 during passage of electrical current between the welding electrodes and through the stack-up, wherein the passage of electrical current has caused melting of the aluminum workpiece that lies adjacent to the steel workpiece and the creation of a molten aluminum weld pool within the aluminum workpiece.

The resistance spot welding method begins by assembling the workpiece stack-up 10 and then positioning the first and second welding electrodes 66, 68 relative to the workpiece stack-up 10 such that the weld face 84 of the first welding electrode 66 (also referred to as the "first weld face 84") confronts the aluminum workpiece surface 24 and the weld face 98 of the second welding electrode 68 (also referred to as the "second weld face 98") confronts the steel workpiece surface 26, as shown in FIGS. 5 and 9. The first weld face 84 and the second weld face 98 are then pressed against their respective aluminum and steel workpiece surfaces 24, 26 in facial alignment with one another under an imposed clamping force at the weld zone 22. The imposed clamping force preferably ranges from 400 lb to 2000 lb or, more narrowly from 600 lb to 1300 lb. While only the aluminum and steel workpieces 12, 14 that overlap and lie adjacent to one another, thereby establishing the faying interface 48 through the composite adhesive layer 20, are depicted in this Figure, the following discussion of the resistance spot welding method applies equally to instances in which the workpiece stack-up 10 includes the additional aluminum workpiece 28 or the additional steel workpiece 30 (FIGS. 3-4).

After the weld faces 84, 98 of first and second welding electrodes 66, 68 are pressed against the aluminum and steel workpiece surfaces 24, 26 of the workpiece stack-up 10, respectively, electrical current is passed between the welding electrodes 66, 68 by way of their facially aligned weld faces 84, 98. The electrical current exchanged between the weld faces 84, 98 is delivered by the power supply 70 which, preferably, is a medium-frequency direct current (MFDC) inverter power supply that includes an inverter and a MFDC transformer. A MFDC transformer can be obtained commercially from a number of suppliers including Roman Manufacturing (Grand Rapids, Mich.), ARO Welding Technologies (Chesterfield Township, Mich.), and Bosch Rexroth (Charlotte, N.C.). The characteristics of the delivered electrical current are controlled by the weld controller 72. Specifically, the weld controller 72 allows a user to program a weld schedule that sets the waveform of the electrical current being exchanged between the welding electrodes 66, 68. The weld schedule allows for customized control of the current level at any given time and the duration of current flow at any given current level, among others, and further allows for such attributes of the electrical current to be responsive to changes in very small time increments down to fractions of a millisecond.

The electrical current exchanged between the weld faces 84, 98 of the first and second welding electrodes 66, 68 passes through the workpiece stack-up 10 and across the faying interface 48 established between the adjacent and confronting faying surfaces 40, 44 of the aluminum and steel workpieces 12, 14. The exchanged electrical current is preferably a DC electrical current that is constant or pulsed over time, or some combination of the two, and has a current level that ranges from 5 kA and 50 kA and lasts for a duration of 40 ms to 2,500 ms. Resistance to the flow of the electrical current initially thermally decomposes the structural thermosetting adhesive matrix 50 of the composite adhesive layer 20 and then rapidly melts the aluminum substrate 32 and creates a molten aluminum weld pool 108 within the aluminum workpiece 12, as shown in FIG. 9. The molten aluminum weld pool 108 penetrates a distance into the aluminum workpiece 12 that ranges from 20% to 100% of the thickness 120 of the aluminum workpiece 12 and is composed predominantly of molten aluminum material derived from the aluminum substrate 32. The steel substrate 36 does not melt and contribute molten steel to the volume of the molten aluminum weld pool 108 during current flow because of its relatively high melting point compared to the aluminum substrate 32.

Figure 11:
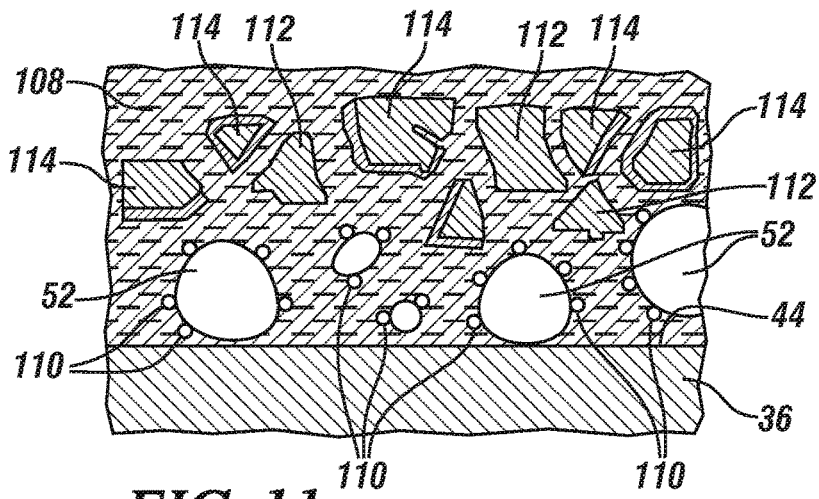
FIG. 11 is an idealized illustration showing the reactive particles of the composite adhesive layer beginning to react with the molten aluminum weld pool to produce high-melting temperature aluminide particles.

The molten aluminum weld pool 108 passes through breaks or other separations in partially-decomposed composite adhesive layer 20 and the refractory oxide surface layer 34 (if present) on the aluminum workpiece 12 under the compressive load applied by the first and second welding electrodes 66, 68 and wets the adjacent faying surface 44 of the steel workpiece 14 within the weld zone 22. In so doing, the molten aluminum weld pool 108 is exposed to the reactive particles 52 dispersed within the composite adhesive layer 20. When this happens, the reactive constituent metal elements of the reactive particles 52 (e.g., Fe, Ni, Co, Mn) escape from the base metal element and migrate into the molten aluminum weld pool 108 where they react with the molten aluminum to form high-melting temperature aluminide particles 110 (FIG. 11). Such aluminide particles 110 are rich in aluminum and additionally include the constituent metal element(s) and/or iron. Particles are rich in aluminum when they include at least 20 at % of aluminum. Indeed, in many cases, the high-melting temperature aluminide particles 110 will include between 20 at % and 80 at % aluminum and between 20 at % and 80 at % of the reactive constituent metal element(s) and/or iron. Iron may be present in the high-melting temperature aluminide particle since, over time, iron that is extracted from the steel workpiece 14 and becomes dissolved in the molten aluminum weld pool 108 may replace some or all of the reactive constituent metal elements in the aluminide particles 110. To that end, some the high-temperature aluminide particles 110 may include at least 20 at % aluminum, and more narrowly between 20 at % and 80 at % aluminum, along with at least one of Fe, Ni, Co, Mn, or a combination thereof (i.e., two or more of Fe, Ni, Co, or Mn). Some specific examples of high-temperature aluminide particles 110 that may be formed in the molten aluminum weld pool 108 include particles of $NiAl_3$, NiMnAl, $FeAl_3$, $Fe_2Al_5$, and FeMnAl, among others.

Figure 10:
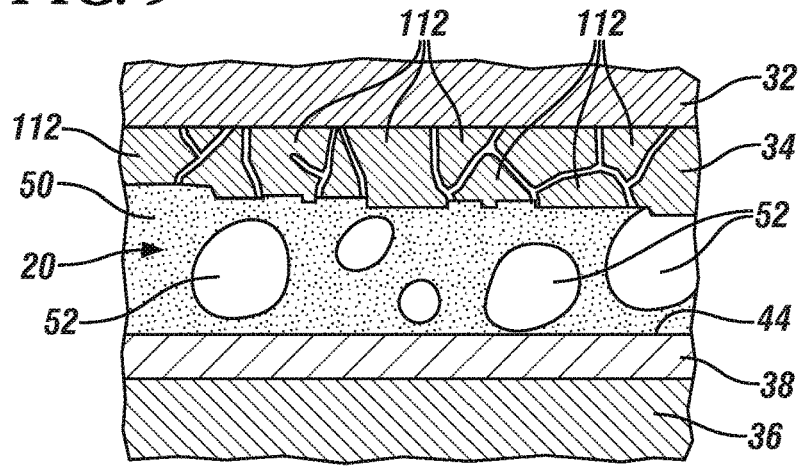
FIG. 10 is an idealized illustration showing the composite adhesive layer of the workpiece stack-up just prior to the formation of a molten aluminum weld pool within the aluminum workpiece.

The infusion of the high-melting temperature aluminide particles 110 into the molten aluminum weld pool 108 is thought to carry any residual oxide film fragments and composite residue film fragments into the molten aluminum weld pool 108 and away from the faying surface 44 of the steel workpiece 14. Without being bound by theory, and with reference to the idealized illustrations of FIGS. 10-12, it is believed that the compressive force applied by the first and second welding electrodes 66, 68 and the softening of the aluminum workpiece 12 during current flow causes the surface layer 34 of a refractory oxide material, if present, to begin to fracture to thereby produce residual oxide film fragments 112. This initial action is shown in FIG. 10. At the same time, due to its relatively low melting temperature, the surface layer 38 on the steel workpiece 14, if present, begins to melt if composed of zinc. Melting of the zinc surface layer 38 on the steel workpiece 14 can help induce migration of the reactive constituent metal elements into the molten aluminum weld pool 108 by beginning to consume the base metal element of the reactive particles 52 through dissolution.

Prior to the aluminum workpiece 12 melting to form the molten aluminum weld pool 108, the structural thermosetting adhesive matrix 50 of the composite adhesive layer 20 thermally decomposes. The thermal decomposition of the structural thermosetting adhesive matrix 50 converts the matrix 50 into composite residue film fragments 114 comprised of, for example, refractory oxide material and residual organics such as carbon ash. As shown in FIG. 11, the molten aluminum weld pool 108 leaches through the breaks and fissures between the residual oxide film fragments 112 and the composite residue film fragments 114 to wet the faying surface 44 of the steel workpiece 14 and, in the process, bring molten aluminum into contact with the reactive particles 52. This type of contact between the molten aluminum weld pool 108 and the reactive particles 52 leads to diffusive migration of the reactive constituent metal elements into the weld pool 108 and the formation of the high-melting temperature aluminide particles 110 underneath the fragments 112, 114.

Figure 12:
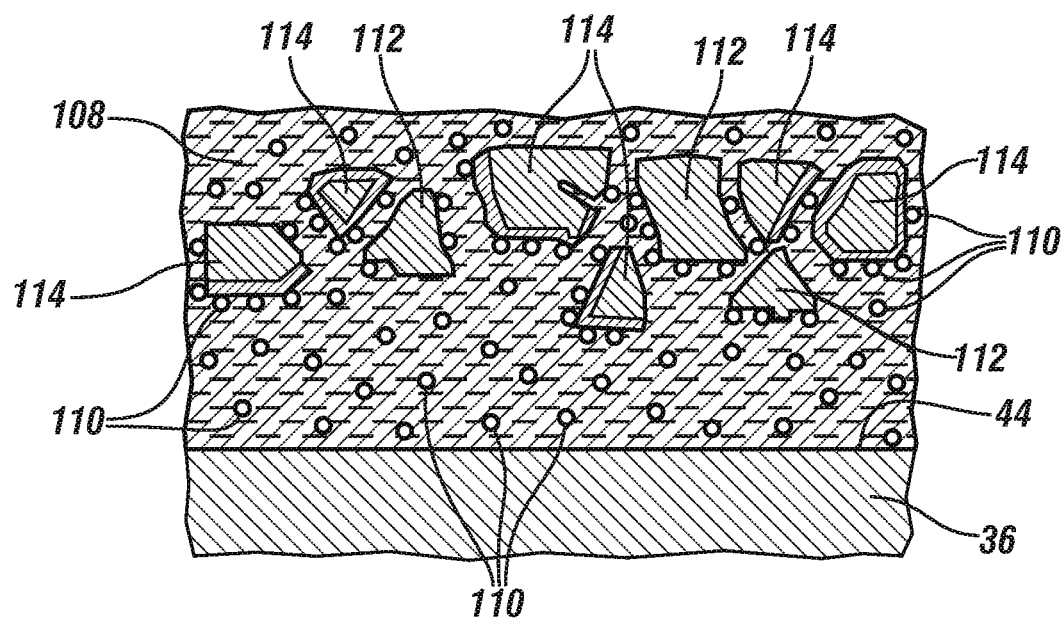
FIG. 12 is an idealized illustration showing the high-melting temperature aluminide particles sweeping away residual oxide film fragments and composite residue film fragments into the molten aluminum weld pool and away from the faying surface of the steel workpiece.

Next, as illustrated in FIG. 12, the high-melting temperature aluminide particles 110 are drawn upwards and away from the faying surface 44 of the steel workpiece 14 into the hotter portions of the molten aluminum weld pool 108. In following this trajectory, the high-melting temperature aluminide particles 110 causes residual oxide film fragments 112 and the composite residue film fragments 114 to be carried away from the faying surface 44 of the steel workpiece 14 and into the interior region of the molten aluminum weld pool 108, thus redistributing those fragments 112, 114 to a more innocuous location. Additionally, in many cases, the high-melting temperature aluminide particles 110 congregate towards the perimeter of the molten aluminum weld pool 108 when migrating away from the faying surface 44 of the steel workpiece 14. This is thought to be a consequence of the lower temperatures and reduced penetration of the molten aluminum weld pool 108 that occurs at the weld pool perimeter. In particular, the created aluminide particles 110 are believed to be trapped by the low penetration of the molten aluminum weld pool 108 at the weld pool perimeter and are subject to less thermal degradation due to the lower temperature of that region. Such conditions lead the high-melting temperature aluminide particles 110 to congregate and settle into an annular ring near the perimeter of the molten aluminum weld pool 108. The significance of such an annular concentration of the high-melting temperature aluminide particles 110 is described in more detail below.

Figure 13:
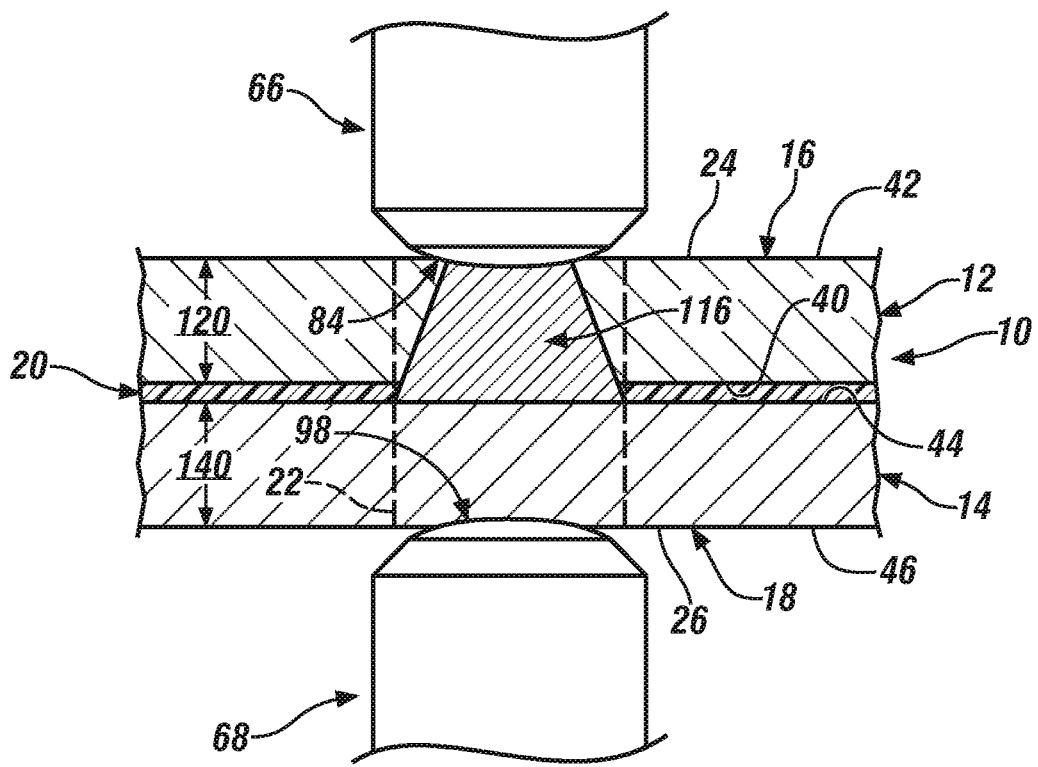
FIG. 13 is a general cross-sectional view of the workpiece stack-up and welding electrodes shown in FIG. 5 after passage of the electrical current between the welding electrodes and through the stack-up has ceased so as to allow the molten aluminum weld pool to solidify into a weld joint that weld bonds the adjacent aluminum and steel workpieces together.

The molten aluminum weld pool 108 solidifies into a weld joint 116 that bonds the aluminum and steel workpieces 12, 14 together within the weld zone 22 when the flow of electrical current between the weld faces 84, 98 of the welding electrodes 66, 68 is terminated, as shown in FIG. 13. The weld joint 116, which is contained within the aluminum workpiece 12 and bonds to the faying surface 44 of the steel workpiece 14, extends from the faying surface 44 of the steel workpiece 14 towards the back surface 42 of the aluminum workpiece 12 to a penetration depth that ranges from 20% to 100% of the thickness 120 of the aluminum workpiece 12. In order to consolidate and move porosity towards the center of the weld joint 116, electrical current may optionally be passed between the weld faces 84, 98 of the first and second welding electrodes 66, 68 and through the weld joint 116 to remelt at least 50% of the bonding area of the weld joint 116, followed by cessation of the electrical current to allow the remelted portion of the joint 116 to resolidify. As many as fourteen remelting/resolidifying stages may be performed. After the weld joint 116 is finally attained, the welding electrodes 66, 68 are retracted and the clamping force applied against the aluminum and steel workpiece surfaces 24, 26 is relieved.

Figure 14:
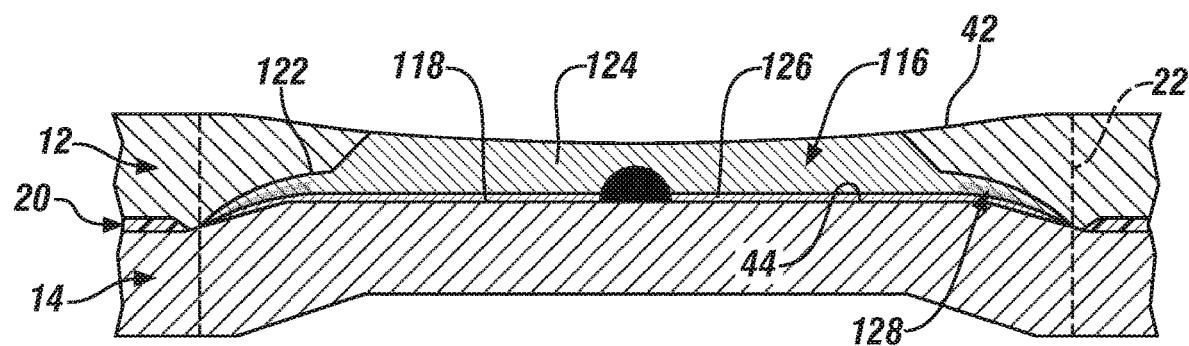
FIG. 14 is a cross-sectional illustration of the weld joint that bonds together the aluminum workpiece and the adjacent steel workpiece of the workpiece stack-up, and wherein the weld joint includes an annular ring of high-melting temperature aluminide particles that protects the weld bond surface of the weld joint.
Figure 15:
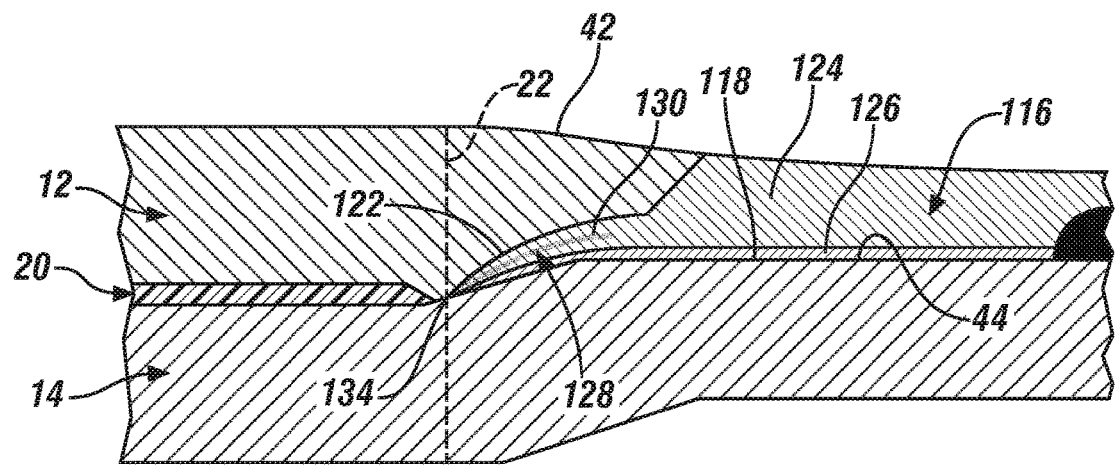
FIG. 15 is a magnified cross-sectional view of the left-hand side of the weld joint shown in FIG. 14 that includes one particular embodiment of the annular ring of aluminide particles.
Figure 16:
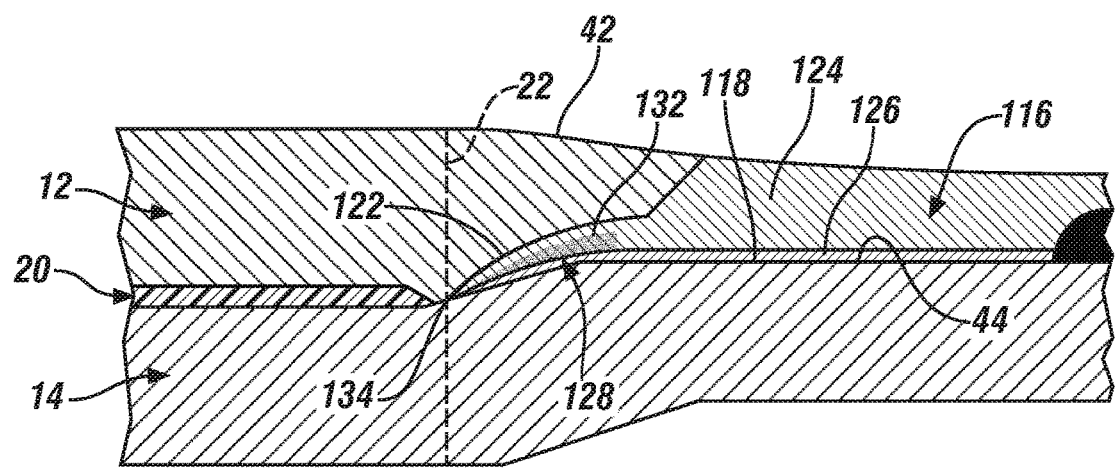
FIG. 16 is a magnified cross-sectional view of the left-hand side of the weld joint shown in FIG. 14 that includes another particular embodiment of the annular ring of aluminide particles.

Referring now to FIGS. 14-16, the weld joint 116 is delineated by a weld bond surface 118 and a workpiece perimeter surface 122. The weld bond surface 118 is adjacent to and bonded with the faying surface 44 of the steel workpiece 14. In a preferred embodiment, the weld bond surface 118 has a surface area that ranges from $4\pi t$ to $20\pi t$, in which the variable "t" is the thickness 120 of the aluminum workpiece 12 within the weld zone 22 prior to formation of the weld joint 116. The workpiece perimeter surface 122 extends away from the weld bond surface 118 in narrowing fashion and constitutes the boundary of the weld joint 116 within the aluminum workpiece 12. The workpiece perimeter surface 122 separates the weld joint 116 from a surrounding heat-affected zone within the aluminum workpiece 12 and, in those instances in which the weld joint 116 fully penetrates the aluminum workpiece 12, is coterminous with a portion of the back surface 44 of the aluminum workpiece 12, as illustrated here in the Figures.

The weld joint 116 includes an aluminum weld nugget 124 and an intermetallic layer 126. The aluminum weld nugget 124 is comprised of resolidified aluminum material, which is derived from the aluminum workpiece 12, and constitutes the largest portion of the weld joint 116 on both a volumetric and a weight percent basis. The intermetallic layer 126 separates the aluminum weld nugget 124 from the faying surface 44 of the steel workpiece 14 and, accordingly, establishes the weld bond surface 118 of the weld joint 116. The intermetallic layer 126 is formed by a metallurgical reaction between the molten aluminum weld pool 108 and the steel workpiece 14 at spot welding temperatures to produce iron-aluminum (Fe—Al) intermetallic compounds. Indeed, the intermetallic layer 126 may include $FeAl_3$ intermetallic compounds, $Fe_2Al_5$ intermetallic compounds, and possibly other iron-aluminum intermetallic compounds, and typically has a thickness along the weld bond surface 118 that ranges from 1 µm to 5 µm. In terms of their comparative physical and mechanical properties, the intermetallic layer 126 is harder, more brittle, and less tough than the aluminum weld nugget 124.

The weld joint 116 may additionally include an annular ring 128 of the high-temperature aluminide particles 110 if the particles 110 are driven to and settle into such a configuration within the molten aluminum weld pool 108. The annular ring 128 of aluminide particles 110 extends upwards from the weld bond surface 118 either along or inside of the workpiece perimeter surface 122 such that it extends radially inwardly into the aluminum weld nugget 124 from a notch root 134 (FIGS. 15-16) that surrounds the weld joint 116. In some embodiments, particularly when the aluminide particles are comprised of nickel aluminide particles, the annular ring 128 may constitute a discrete barrier 130, as shown ideally in FIG. 15. In other embodiments, particularly when the aluminide particles are composed of iron aluminide particles, the annular ring 128 may constitute a dispersion band 132, as shown ideally in FIG. 16. The dispersion band 132 is a less dense collection of the high-melting temperature aluminide particles 110 than the barrier 130 but shares the same basic function.

The incorporation of the high-temperature aluminide particles 110 into the weld joint 116 is believed to enhance the strength, most notably the strength in peel and cross tension, of the weld joint 116. In particular, if the aluminum workpiece 12 originally includes the surface layer 34 of a refractory oxide material, which is often the case, the migration of the constituent metal elements from the reactive particles 52 into the molten aluminum weld pool 108—and the concurrent transformation of those elements into the high-temperature aluminide particles 110—causes the residual oxide film fragments 112 and the composite residue film fragments 114 to be carried away from the faying surface 44 of the steel workpiece 13 and up into the weld pool 108 so that they become trapped within the bulk of the aluminum weld nugget 124 away from the weld bond surface 118 upon solidification of the weld pool 108. As such, the residual oxide film fragments 112 and the composite residue film fragments 114 are virtually absent at the weld bond surface 118 of the weld joint 116. Keeping such fragments away from the weld bond surface 118 is considered to be beneficial since near-interface defects of that kind have a tendency to interfere with the integrity of the weld bond surface 118 of the weld joint 116.

Moreover, if the high-temperature aluminide particles 110 congregate into the annular ring 128, as shown in FIGS. 14-16, they can shield the weld bond surface 118 of the weld joint 116 from cracks that may propagate from the adjacent notch root 134. To be sure, the annular ring 128 of the high-temperature aluminide particles 110 functions as a hard and strong impediment to crack propagation. As such, when a crack originates in the notch root 134 and begins propagating inward into the weld joint 116, the crack is deflected along a non-preferred path into the bulk of the aluminum weld nugget 124. Deflecting crack propagation in this way is less likely to compromise the weld joint 116 since the aluminum weld nugget 124 is softer and tougher than the intermetallic layer 126 situated along the weld bond surface 118 of the weld joint 116. The annular ring 128 of the high-temperature aluminide particles 110, if formed, thus protects the portion of the weld joint 116 (i.e., the intermetallic layer 126) that is most susceptible to crack propagation and, consequently, most likely to be the cause of interfacial failure of the weld joint 10 under an applied load. The afforded protection against rapid crack growth through the intermetallic layer 126 as aided by near-interface weld disparities helps avoid interfacial joint failure at the weld bond interface 118 when the weld joint 116 is subjected to loading.

The embodiment of the disclosed method just described represents one particular way of locating a source of a reactive metal in a diffusible state along the faying interface of the aluminum and steel workpieces 12, 14. Other techniques may also be practiced to achieve similar results. For example, as shown in FIGS. 17-26 and described in more detail below, the source of a diffusible reactive metal may be in the form of a reactive alloy layer that confronts and is in proximate contact (i.e., direct contact or indirect contact through an intervening organic material layer) with the faying surface 40 of the aluminum workpiece 12 within the weld zone 22. The reactive alloy layer is capable of creating high-melting temperature aluminide particles when the aluminum workpiece 12 is melted during passage of an electrical current through the stacked workpieces 12, 14 and the reactive alloy layer is exposed to, and reacts with, a molten aluminum weld pool created within the aluminum workpiece 12. The reactive alloy layer can take on a variety of forms including a surface layer that forms part of the steel workpiece 14 or part of a distinct shim that can be interposed between the aluminum workpiece 12 and the steel workpiece 14. The reactive alloy layer is identified by reference numeral 150 in FIGS. 17-26 and is shown with an exaggerated thickness solely to aid with the description. For all other features in FIGS. 17-26, the use of the same references numerals as found in similar illustrations to those of FIGS. 1-16 indicates that the earlier description of that feature in the previous embodiment of the disclosed method applies equally here to this embodiment.

The reactive alloy layer 150 shown in FIGS. 1-16 comprises a base metal element and one or more reactive constituent metal elements alloyed with the base metal element in a diffusible state. The base metal element is preferably zinc or some other metal that is readily soluble in the molten aluminum weld pool formed during spot welding of the workpiece stack-up 10. Each of the one or more reactive constituent metal elements alloyed with the base metal element may be any metal element that can react with molten aluminum in the weld pool to form the high-melting temperature aluminide particles. Preferred reactive constituent metal elements that can react in this way include iron and nickel. While a thickness 151 of the reactive alloy layer 150 may vary depending on several factors, including the composition and thickness of the aluminum and steel workpieces 12, 14 and the weld schedule employed, in many instances the thickness 151 of the reactive alloy layer 150 ranges from 2 μm to 100 μm or, more narrowly, from 5 μm to 30 μm.

The one or more reactive constituent metal elements are alloyed with the base metal element in a diffusible state when they can be easily released from the base metal element for migration into the molten aluminum weld pool, which is similar to the way in which the constituent metal elements are incorporated into the reactive particles 52 of the previous embodiment. That is, a diffusible state can be accomplished when the one or more constituent metal elements are weakly bound and sufficiently diluted or dispersed within the base metal element. Indeed, a base metal element that binds the one or more constituent metal elements too strongly will release only a negligible proportion of the constituent metal element(s) into the molten aluminum weld pool, while a reactive alloy layer 150 that has too high of a concentration of reactive constituent metal element (s) is likely to produce a contiguous aluminide layer at the surface of the molten aluminum weld pool that prematurely terminates or otherwise blocks the migration of the reactive constituent metal element(s) into the weld pool. A diffusible state of the one or more constituent metal elements can typically be attained when the base metal element is zinc and the reactive alloy layer 150 contains up to 35 wt %, or more preferably between 10 wt % and 25 wt %, of the one or more constituent metal elements.

Much like in the previous embodiment, the high-melting temperature aluminide particles produced by the reaction between the reactive alloy layer 150 and the molten aluminum weld pool exhibit mobility into and within the weld pool in a way that enhances the strength characteristics of the ultimately-formed weld joint. This joint-strengthening effect occurs because the high-temperature aluminide particles migrate into the molten aluminum weld pool and, in doing so, lift and carry oxide film fragments and composite layer residue fragments (if present) up into the weld pool to keep those fragments away from the steel workpiece 14. The high-melting temperature aluminide particles may also arrange themselves into an annular ring that protects a bonding interface between the weld joint and the adjoining the steel workpiece 14 from crack propagation under an applied load. The afforded protection against crack propagation under an applied load is noteworthy since oftentimes the primary cause of interfacial joint failure is rapid crack growth through the intermetallic layer as aided by near-interface weld disparities.

Figure 17:
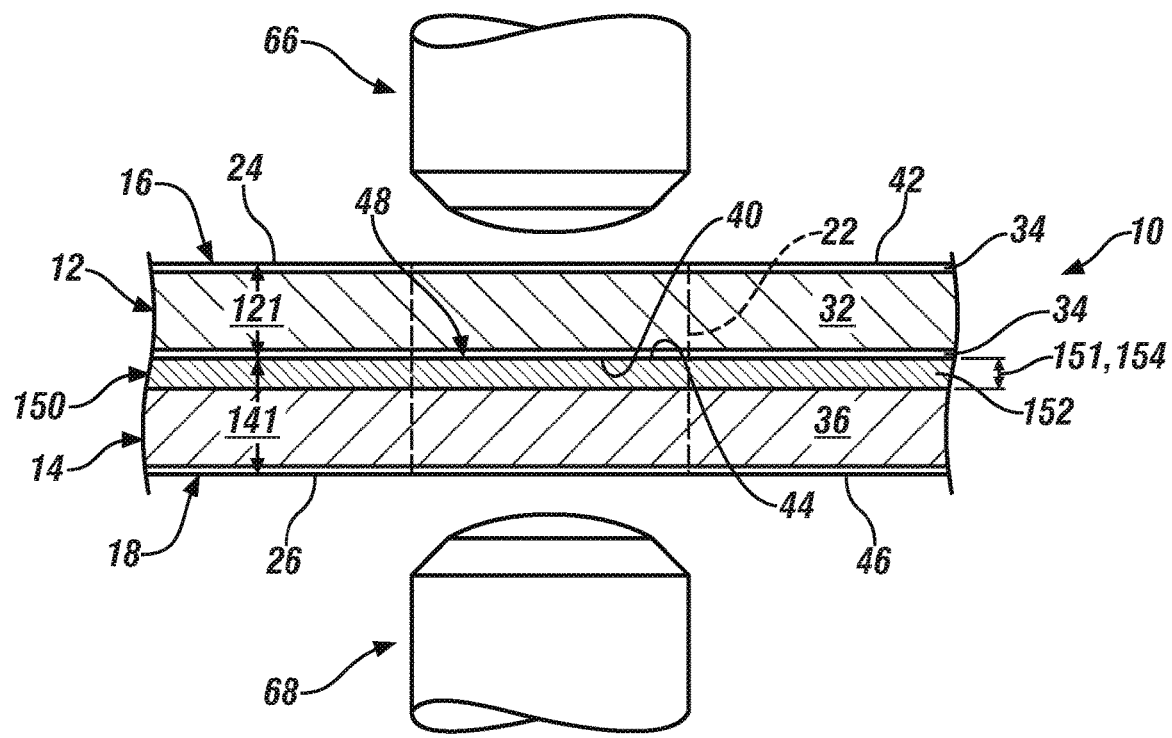
FIG. 17 is a cross-sectional illustration of a workpiece stack-up in preparation for resistance spot welding according to another embodiment of the disclosed method in which the stack-up includes overlapping aluminum and steel workpieces along with a reactive alloy layer that makes proximate contact with a faying surface of the aluminum workpiece.
Figure 18:
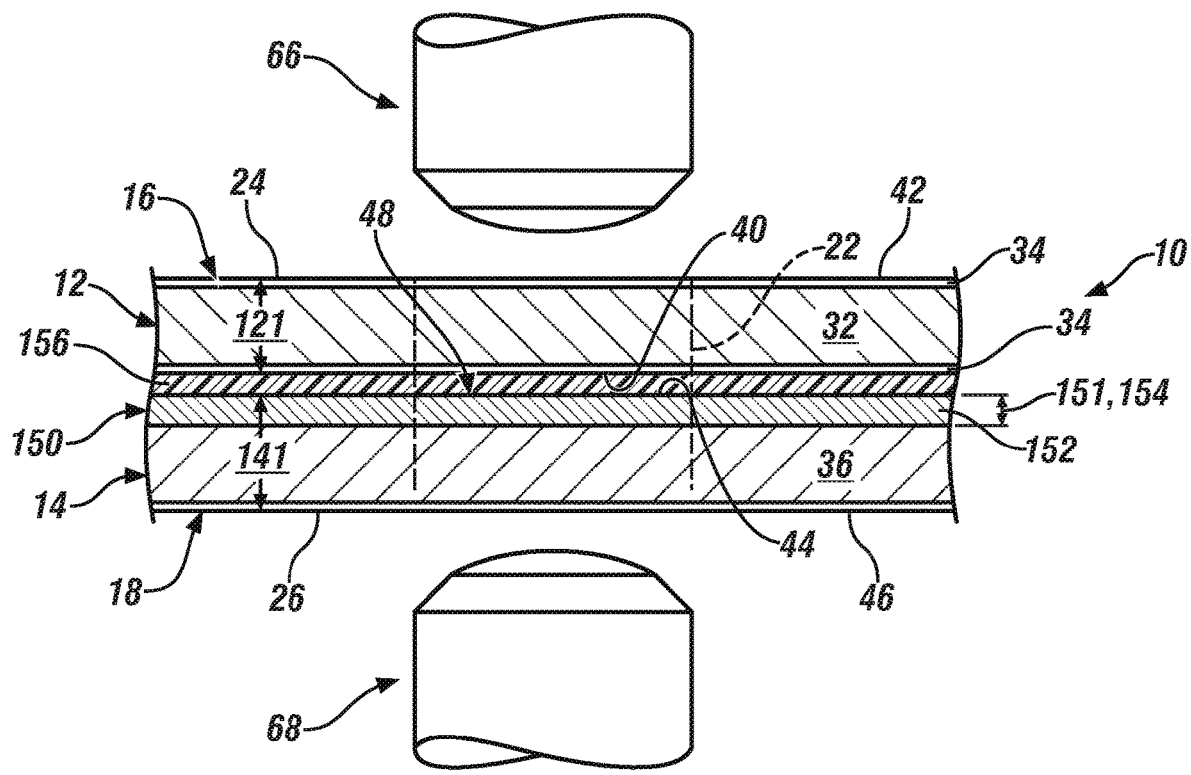
FIG. 18 is a cross-sectional illustration of another implementation of a workpiece stack-up in preparation for resistance spot welding in which the stack-up includes overlapping aluminum and steel workpieces along with a reactive alloy layer that makes proximate contact with a faying surface of the aluminum workpiece.
Figure 19:
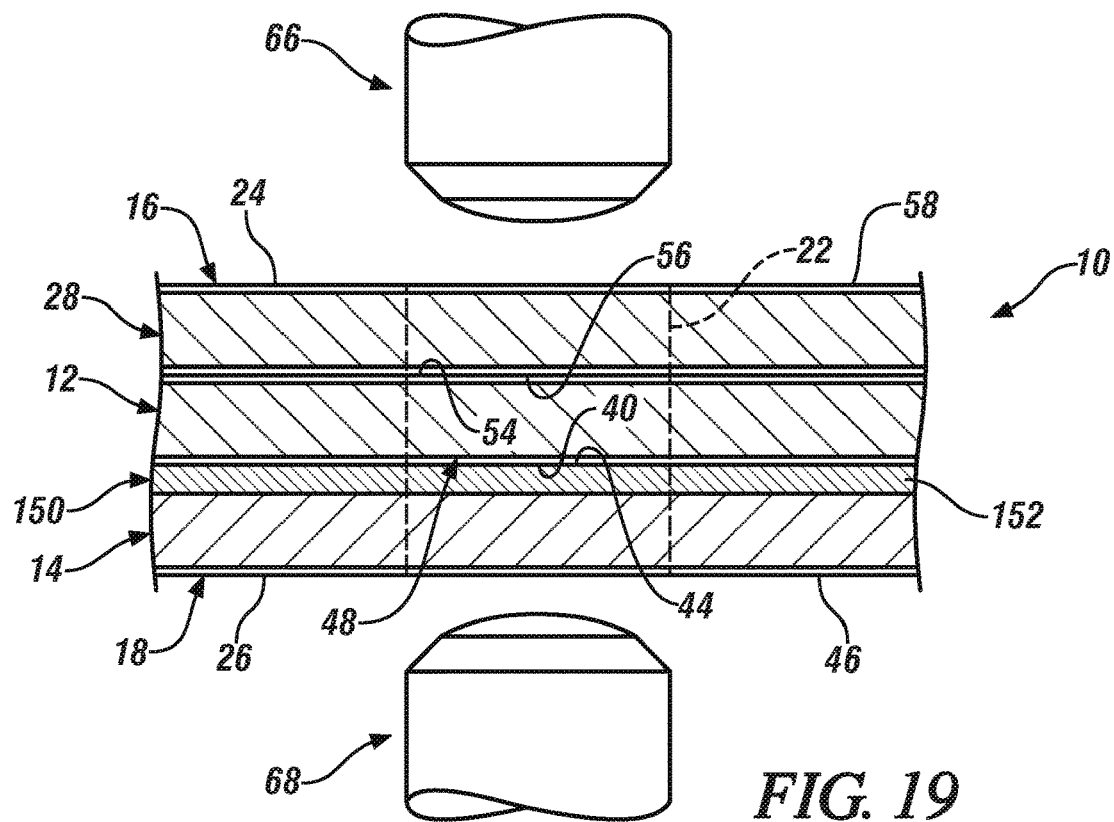
FIG. 19 is a cross-sectional illustration of another implementation of a workpiece stack-up in preparation for resistance spot welding in which the stack-up includes overlapping aluminum and steel workpieces along with a reactive alloy layer that makes proximate contact with a faying surface of the aluminum workpiece, wherein here the workpiece stack-up includes an additional aluminum workpiece.
Figure 20:
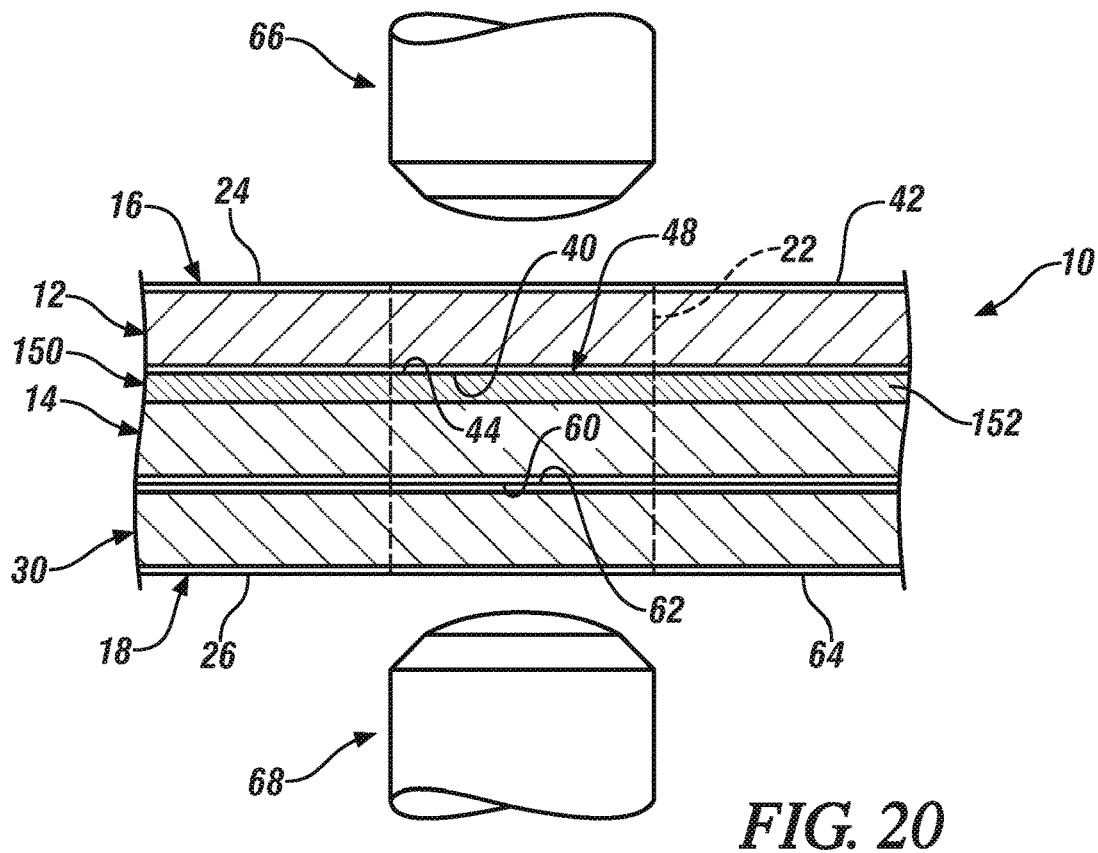
FIG. 20 is a cross-sectional illustration of another implementation of a workpiece stack-up in preparation for resistance spot welding in which the stack-up includes overlapping aluminum and steel workpieces along with a reactive alloy layer that makes proximate contact with a faying surface of the aluminum workpiece, wherein here the workpiece stack-up includes an additional steel workpiece.

A preferred implementation of resistance spot welding the workpiece stack-up 10 that includes the aluminum workpiece 12 and the adjacent overlapping steel workpiece 14 in accordance with this embodiment is illustrated generally in FIGS. 17-20. Referring for the moment to FIGS. 17-18, the workpiece stack-up 10 has a first side 16 and a second side 18 and includes at least the aluminum workpiece 12 and the steel workpiece 14 which, as shown, overlap with and lie adjacent to one another (as far as the relative positioning of metal workpieces) through a weld zone 22. The first side 16 of the workpiece stack-up 10 is provided by an aluminum workpiece surface 24 and the second side 18 is provided by steel workpiece surface 26. The workpiece stack-up 10 may thus be assembled as a "2T" stack-up that includes only the adjacent pair of aluminum and steel workpieces 12, 14, or it may be assembled as a "3T" stack-up that includes the adjacent aluminum and steel workpieces 12, 14 plus an additional aluminum workpiece 28 (aluminum-aluminum-steel as shown in FIG. 19) or an additional steel workpiece 30 (aluminum-steel-steel as shown in FIG. 20) so long as the two workpieces of the same base metal composition are disposed next to each other. The workpiece stack-up 10 may even include more than three workpieces such as an aluminum-aluminum-steel-steel stack-up, an aluminum-aluminum-aluminum-steel stack-up, or an aluminum-steel-steel-steel stack-up.

The aluminum workpiece 12 includes a base aluminum substrate 32 and the steel workpiece 14 includes a base steel substrate 36 in much the same way as described earlier with respect to the previous embodiment of the disclosed method. Accordingly, the previous descriptions of the base aluminum substrate 32 and the base steel substrate 36 apply equally to this embodiment of the disclosed method as well. However, in this embodiment, and as shown in FIG. 17, the reactive alloy layer 150 that confronts and proximately contacts a faying surface 40 of the aluminum workpiece 12 is part of the steel workpiece 14. Specifically, the reactive alloy layer 150 is adhered to the base steel substrate 36 as a reactive alloy surface layer 152 that provides and delineates at least a faying surface 44 of the steel workpiece 14 and, if desired, both the faying surface 44 and a back surface 46 of the steel workpiece 14, as shown here in FIG. 17. The reactive alloy surface layer 152 has a thickness 154 that preferably ranges from 2 μm to 100 μm or, more narrowly, from 5 μm to 30 μm. The steel workpiece 14 in this embodiment thus encompasses a wide variety of base steel substrates that include the reactive alloy layer 150 as an adhered surface layer 152. Taking into account the thickness of the base steel substrate 36 and the reactive alloy surface layer 152, the steel workpiece 14 has a thickness 141 that ranges from 0.3 mm and 6.0 mm, or more narrowly from 0.6 mm to 2.5 mm, at least at the weld zone 22.

Three particularly preferred embodiments of the reactive alloy surface layer 152 are a galvanneal zinc-iron alloy layer, an electrodeposited zinc-nickel alloy layer, or an electrodeposited zinc-iron alloy layer. The galvanneal zinc-iron layer may be made by hot-dip immersing the base steel substrate 36 in a molten zinc bath after cleaning and preparing the surface of the steel substrate 36 for reaction with zinc. The molten zinc bath includes at least 98 wt % pure zinc and is maintained at a temperature of 435° C. to 455° C. When the base steel substrate 36 is immersed in the bath, the molten zinc reacts with the iron of the steel substrate 36 and forms an external layer of zinc that is metallurgically bonded to the substrate by minimally thick Al—Zn—Fe intermetallic layers. Upon withdrawing the base steel substrate 36 with its zinc coating from the molten zinc bath, excess liquid zinc is removed and the steel substrate 36 is reheated before the applied zinc coating can solidify. The base steel substrate 36 is typically reheated in an induction or gas heating furnace maintained at a temperature of 500° C. to 565° C. for a time period of up to ten seconds. Such annealing of the zinc coating causes an iron-zinc diffusion reaction to occur which, ultimately, converts the zinc coating into the galvanneal zinc-iron alloy layer.

The galvanneal zinc-iron alloy layer has a bulk average composition that includes 8 wt % to 12 wt % iron and 0.5 wt % to 4 wt % aluminum with the balance (in wt %) being zinc. The bulk average weight percent of those materials is determined by averaging their actual weight percents across the thickness 154 of the galvanneal zinc-iron alloy layer through the various alloy phases of the zinc-iron alloy. To be sure, zinc and iron are typically not uniformly distributed across the thickness 154 of the galvanneal zinc-iron alloy layer; rather, the weight percent of iron decreases (and consequently the weight percent of zinc increases) within the galvanneal zinc-iron layer when moving in a direction away from the base steel substrate 36 in sequence through a gamma phase (γ) ($Fe_3Zn_{10}$), a delta phase (δ) ($FeZn_{10}$), and a zeta phase (ζ) ($FeZn_{13}$) of the alloy. In many instances, for example, the gamma phase of the galvanneal zinc-iron alloy layer contains 15.6 wt % to 28.0 wt % iron and 1.2 wt % to 1.6 wt % aluminum, the delta phase contains 7.0 wt % to 11.5 wt % iron and 3.5 wt % to 4.0 wt % aluminum, and the zeta phase contains 5.0 wt % to 6.3 wt % iron and 0.5 wt % to 0.8 wt % aluminum.

The electrodeposited zinc-nickel alloy layer may be made by immersing the base steel substrate 36 as a working electrode into either an alkaline-based or an acid-based plating bath that includes ions of zinc and nickel followed by the application of sufficient electrical current to plate and adhere the zinc-nickel alloy layer onto the base steel substrate 36. The material used in the plating bath and the particulars of the electrodeposition process are preferably carried out to plate and adhere a certain zinc-nickel alloy phase that exhibits good ductility and corrosion protection— namely, the gamma phase (γ) ($Ni_5Zn_{21}$) of the zinc-nickel alloy. As such, in a preferred embodiment, the electrodeposited zinc-nickel alloy layer is comprised of gamma phase (γ) zinc-nickel alloy. Such a layer of zinc-nickel alloy may include between 8 wt % to 18 wt % nickel, or more narrowly between 12 wt % to 16 wt % nickel, with the balance (in wt %) being zinc.

The electrodeposited zinc-iron layer may be made by a generally similar electrodepositing process as described above except that the process is tailored to deposit a zinc-iron alloy layer as opposed to a zinc-nickel alloy layer. The electrodeposited zinc-iron layer may include anywhere from 5 wt % to 30 wt % iron, with the balance being zinc, and may include all gamma phase (γ) alloy ($Fe_3Zn_{10}$), all delta phase (δ) alloy ($FeZn_{10}$), all zeta phase (ζ) alloy ($FeZn_{13}$), or a combination of any two or more of those phases. The exact composition and phase of the zinc-iron alloy depends on several factors including, most notably, the particulars of the electrodeposition process being carried out.

The reactive alloy surface layer 152 may establish proximate contact with the faying surface 40 of the aluminum workpiece 12 at the faying interface 48 prior to current flow by direct contact, as shown in FIG. 17, or by indirect contact through an intervening organic material layer 156, as shown in FIG. 18. As shown in FIG. 17, the reactive alloy surface layer 152 and the faying surface 40 of the aluminum workpiece 14 are in direct contact at the weld zone 22 when they are in direct interfacial contact with one another due to the complete absence of an intervening material (such as the organic material layer 156 shown in FIG. 18) or when an intervening material is originally present but becomes substantially entirely laterally displaced by the force of opposed welding electrodes. The reactive alloy surface layer 152 and the faying surface 40 of the aluminum workpiece 14 are in indirect contact at the weld zone 22 when they are not in direct interfacial contact with one another but, nevertheless, are separated by and interface with opposite sides of the intervening adhesive layer 156.

The intervening organic material layer 156 that may be present between the faying surfaces 40, 44 of the adjacent steel and aluminum workpieces 12, 14, as shown in FIG. 18, may be an adhesive material layer that includes a structural thermosetting adhesive matrix. The structural thermosetting adhesive matrix may be any curable structural adhesive including, for example, as a heat-curable epoxy or a heat curable polyurethane. Some specific examples of heat-curable structural adhesives that may be used as the adhesive matrix include DOW Betamate 1486, Henkel Terokal 5089, and Uniseal 2343, all of which are commercially available.

Additionally, while not shown in FIG. 18, the adhesive material layer may further include optional filler particles, such as silica particles, dispersed throughout the thermosetting adhesive matrix to modify the viscosity or other mechanical properties of the adhesive matrix when cured. The intervening organic material layer 156 preferably has a thickness through the weld zone 22 between 0.1 mm to 2.0 mm or, more narrowly, between 0.2 mm to 1.0 mm, regardless of whether the layer is an adhesive material layer is comprised of some other organic material such as a sealer or sound-proofing material.

The intervening organic material layer 156, if present, can be spot welded through rather easily at the temperatures and electrode clamping pressures attained at the weld zone 22 during current flow. Under spot welding conditions, the intervening organic material layer 156 is laterally displaced at least to some extend and thermally decomposed within the weld zone 22 during current flow to leave behind residuals (e.g., carbon ash, filler particles, etc.) derived from the organic material near the faying surface 44 of the steel workpiece 14. Outside of the weld zone 22, however, the intervening organic material layer 156 remains generally undisturbed. In that regard, if the intervening organic material layer 156 is an adhesive material layer, additional bonding between the faying surfaces 40, 44 of the aluminum and steel workpieces 12, 14 can be achieved by heating the workpiece stack-up 10 in an ELPO-bake oven or other heating apparatus following spot welding so as to cure the structural thermosetting adhesive matrix of the adhesive material layer that is still intact around the weld zone 22.

The aluminum workpiece surface 24 and the steel workpiece surface 26 that provide the first and second sides 16, 18 of the workpiece stack-up 10 may be presented by the adjacent and overlapping aluminum and steel workpieces 12, 14 when the stack-up 10 is assembled a "2T" stack-up. For example, when the two workpieces 12, 14 are stacked-up for spot welding in the context of the embodiment shown in FIGS. 17-18, the faying surfaces 40, 44 of the two workpieces 12, 14 overlap and confront one another to establish the faying interface 48 within the weld zone 22 while their respective back surfaces 42, 46 face away from one another in opposite directions so as to constitute the aluminum and steel workpiece surfaces 24, 26, respectively, of the stack-up 10. Of course, as shown in FIGS. 19-20, the workpiece stack-up 10 is not limited to the inclusion of only the aluminum workpiece 14 and the adjacent steel workpiece 16. The workpiece stack-up 10 may also be assembled to include the additional aluminum workpiece 28 or the additional steel workpiece 30—in addition to the adjacent aluminum and steel workpieces 12, 14—so long as the additional workpiece is disposed adjacent to the workpiece 12, 14 of the same base metal composition; that is, any additional aluminum workpiece 28 is disposed adjacent to the other aluminum workpiece 12 and any additional steel workpiece 30 is disposed adjacent to the other steel workpiece 14, as previously described.

As shown in FIG. 19, for example, the workpiece stack-up 10 may include the adjacent aluminum and steel workpieces 12, 14 described above along with the additional aluminum workpiece 28 that overlaps and lies adjacent to the aluminum workpiece 12. When the additional aluminum workpiece 28 is so positioned, the back surface 46 of the steel workpiece 14 constitutes the steel workpiece surface 26 that provides the second side 18 of the workpiece stack-up 10, as before, while the aluminum workpiece 12 that lies adjacent to the steel workpiece 14 now includes a pair of opposed faying surfaces 40, 54. The faying surface 40 of the aluminum workpiece 12 that faces the steel workpiece 14 still experiences proximate contact with the reactive alloy surface layer 152 and continues to establish the faying interface 48 along with the confronting faying surface 44 of the steel workpiece 14, as previously described. The other faying surface 54 of the aluminum workpiece 12 overlaps and confronts a faying surface 58 of the additional aluminum workpiece 28. As such, in this particular arrangement of lapped workpieces 28, 12, 14, a back surface 58 of the additional aluminum workpiece 28 now constitutes the aluminum workpiece surface 24 that provides the first side 16 of the workpiece stack-up 10.

In another example, as shown in FIG. 20, the workpiece stack-up 10 may include the adjacent aluminum and steel workpieces 12, 14 described above along with the additional steel workpiece 30 that overlaps and is disposed adjacent to the steel workpiece 14. When the additional steel workpiece 30 is so positioned, the back surface 42 of the aluminum workpiece 12 constitutes the aluminum workpiece surface 24 that provides the first side 16 of the workpiece stack-up 10, as before, while the steel workpiece 14 that lies adjacent to the aluminum workpiece 12 now includes a pair of opposed faying surfaces 44, 60. The faying surface 44 of the steel workpiece 14 that faces the aluminum workpiece 12 continues to establish the faying interface 48 along with the confronting faying surface 40 of the aluminum workpiece 12, and the latter faying surface 40 continues to experience proximate contact with the reactive alloy surface layer 152, as previously described. The other faying surface 60 of the steel workpiece 14 overlaps and confronts a faying surface 62 of the additional steel workpiece 30. As such, in this particular arrangement of lapped workpieces 12, 14, 30, a back surface 64 of the additional steel workpiece 30 now constitutes the steel workpiece surface 26 that provides the second side 18 of the workpiece stack-up 10.

Figure 21:
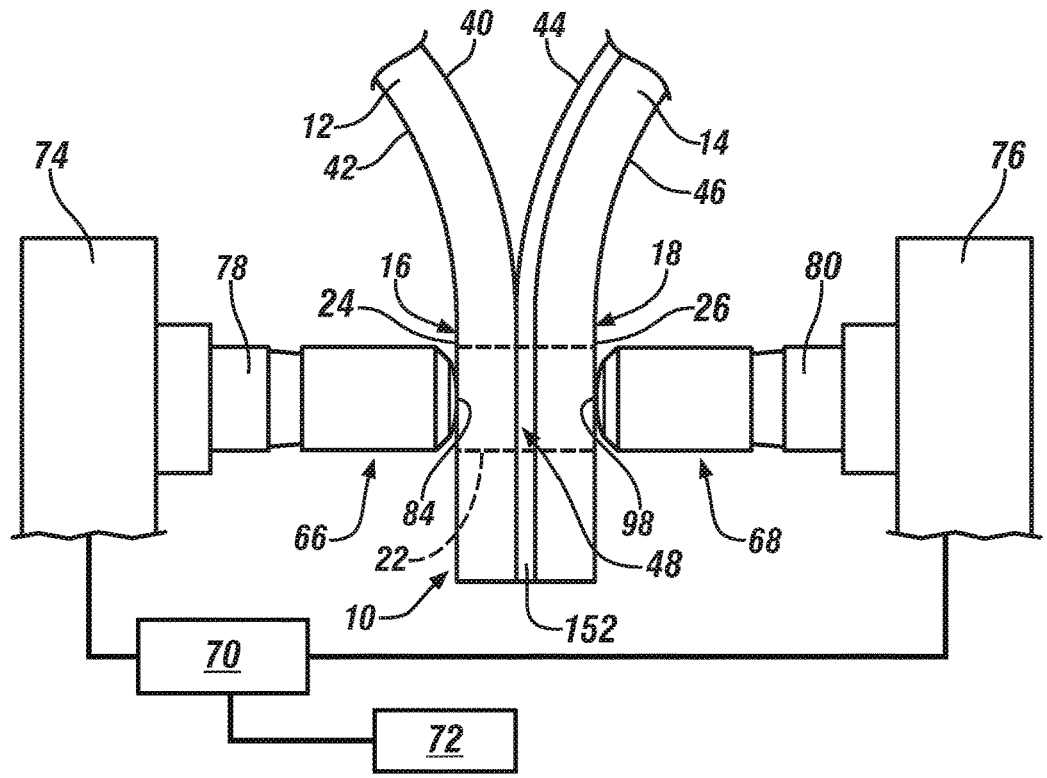
FIG. 21 is a general cross-sectional view of a workpiece stack-up, which includes overlapping aluminum and steel workpieces along with a reactive alloy layer that makes proximate contact with a faying surface of the aluminum workpiece, situated between a set of opposed welding electrodes in preparation for resistance spot welding.

Turning now to FIG. 21, the workpiece stack-up 10 is shown after being assembled along with a first welding electrode 66 and a second welding electrode 68 of a larger resistance spot weld gun (partially depicted). The construction and operation of the weld gun and the first and second welding electrodes 66, 68 has already been described in connection with FIGS. 5-8 of the previous embodiment. The earlier discussion applies equally to this embodiment of the disclosed method and, thus, need not be repeated here.

Figure 22:
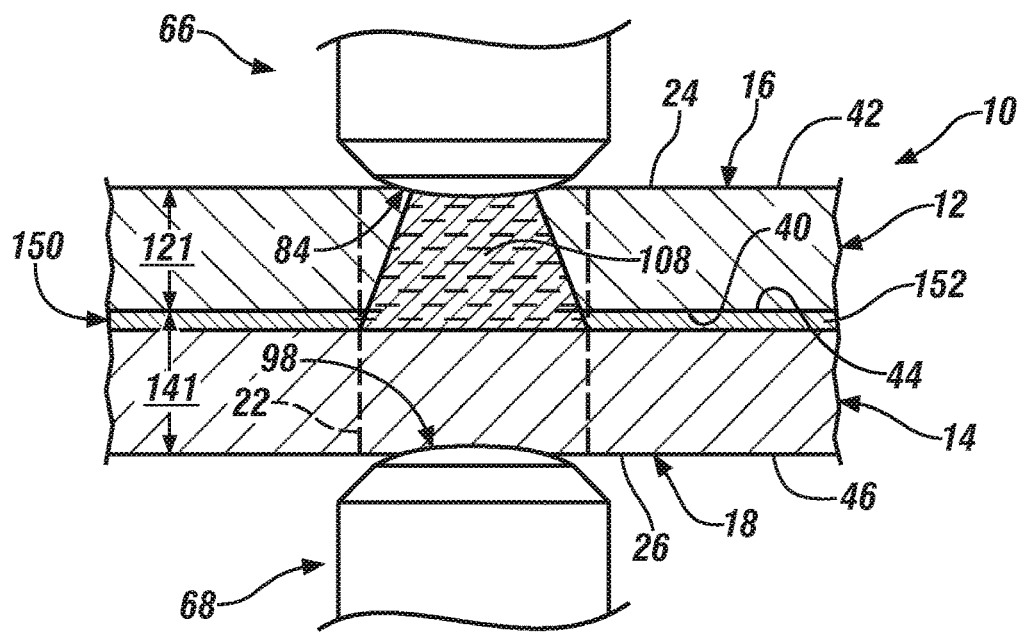
FIG. 22 is a general cross-sectional view of the workpiece stack-up and welding electrodes shown in FIG. 21 during passage of electrical current between the welding electrodes and through the stack-up, wherein the passage of electrical current has caused melting of the aluminum workpiece that lies adjacent to the steel workpiece and the creation of a molten aluminum weld pool within the aluminum workpiece.

The resistance spot welding method begins by assembling the workpiece stack-up 10 and then positioning the first and second welding electrodes 66, 68 relative to the workpiece stack-up 10 such that the weld face 84 of the first welding electrode 66 (also referred to as the "first weld face 84") confronts the aluminum workpiece surface 24 and the weld face 98 of the second welding electrode 68 (also referred to as the "second weld face 98") confronts the steel workpiece surface 26, as shown in FIGS. 21 and 22. The first weld face 84 and the second weld face 98 are then pressed against their respective aluminum and steel workpiece surfaces 24, 26 in facial alignment with one another under an imposed clamping force at the weld zone 22. The imposed clamping force preferably ranges from 400 lb to 2000 lb or, more narrowly from 600 lb to 1300 lb. While only the aluminum and steel workpieces 12, 14 that overlap and lie adjacent to one another are depicted in this Figure, the following discussion of the resistance spot welding method applies equally to instances in which the workpiece stack-up 10 includes the additional aluminum workpiece 30 or the additional steel workpiece 32 (FIGS. 19-20). After the weld faces 84, 98 of first and second welding electrodes 66, 68 are pressed against the aluminum and steel workpiece surfaces 24, 24 of the workpiece stack-up 10, respectively, electrical current is passed between the welding electrodes 66, 68 by way of their facially aligned weld faces 84, 98.

The electrical current exchanged between the weld faces 84, 98 of the first and second welding electrodes 66, 68 passes through the workpiece stack-up 10 and across the faying interface 48 established between the adjacent and confronting faying surfaces 40, 44 of the aluminum and steel workpieces 12, 14. The exchanged electrical current is preferably a DC electrical current that is constant or pulsed over time, or some combination of the two, and has a current level that ranges from 5 kA and 50 kA and lasts for a duration of 40 ms to 2,500 ms. Resistance to the flow of the electrical current initially heats and thermally decomposes the intervening organic material layer 156 (if present) and then rapidly melts the aluminum substrate 32 and creates a molten aluminum weld pool 108 within the aluminum workpiece 12, as shown in FIG. 22. The molten aluminum weld pool 108 penetrates a distance into the aluminum workpiece 12 that ranges from 20% to 100% of the thickness 121 of the aluminum workpiece 12 and is composed predominantly of molten aluminum material derived from the aluminum substrate 32. The steel substrate 36 does not melt and contribute molten steel to the volume of molten aluminum weld pool 108 during current flow because of its relatively high melting point compared to the aluminum substrate 32.

Figure 24:
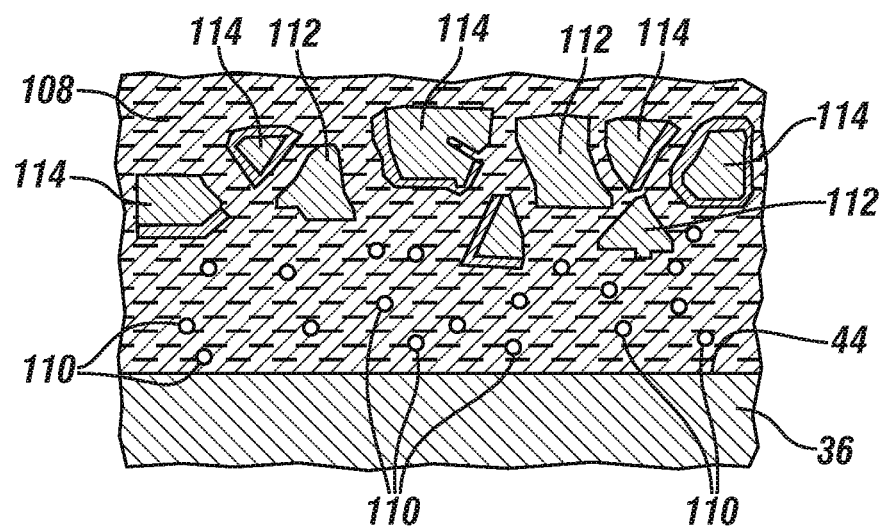
FIG. 24 is an idealized illustration showing the reactive alloy layer reacting with the molten aluminum weld pool to produce high-melting temperature aluminide particles.

The molten aluminum weld pool 108 passes through breaks or other separations in the refractory oxide surface layer 34 on the aluminum workpiece 12 and the decomposed intervening organic material layer 156—if either or both are present—under the compressive load applied by the first and second welding electrodes 66, 68 and wets the adjacent faying surface 44, and thus the reactive alloy surface layer 152, of the steel workpiece 14 within the weld zone 22. When this happens, the molten aluminum weld pool 108 reacts with the reactive alloy surface layer 152, causing the constituent metal elements (e.g., Fe, Ni) to escape from the base metal element and to migrate into the molten aluminum weld pool 108 where they react with the molten aluminum to form high-melting temperature aluminide particles 110 (FIG. 24). Such aluminide particles 110 are rich in aluminum and additionally include one or more of the constituent metal element(s). Particles are rich in aluminum when they include at least 20 at % of aluminum. Indeed, in many cases, the high-melting temperature aluminide particles 110 will include between 20 at % and 80 at % aluminum and 20 at % and 80 at % of the constituent metal element(s) with the understanding that, over time, nickel that may be originally present in the high-temperature aluminide particles 110 may be replaced partially or fully by iron that is dissolved in the molten aluminum weld pool 108, as discussed above. To that end, in this embodiment, some the high-temperature aluminide particles 110 may include at least 20 at % aluminum, and more narrowly between 20 at % and 80 at % aluminum, along with at least one of Fe, Ni, or a combination thereof (i.e., Fe and Ni). Some specific examples of high-temperature aluminide particles 110 that may be formed in the molten aluminum weld pool 108 include particles of $NiAl_3$, $FeAl_3$, and $Fe_2Al_5$, among others.

Figure 23:
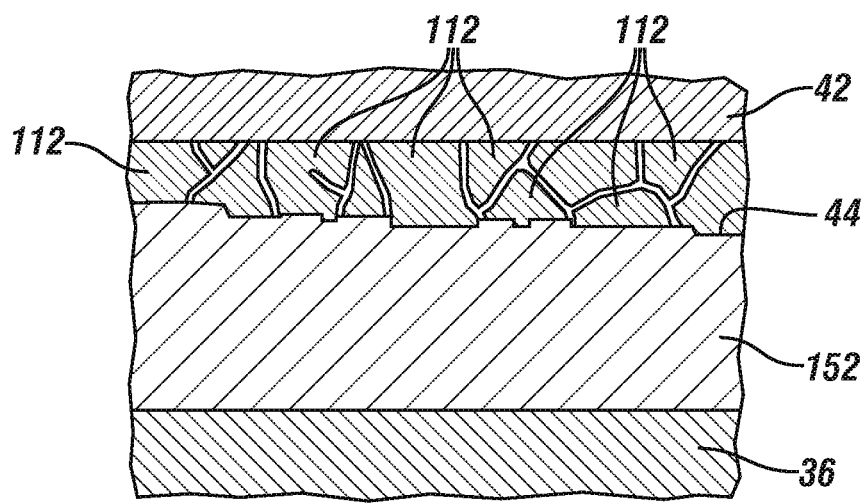
FIG. 23 is an idealized illustration showing the reactive alloy layer of the workpiece stack-up just prior to the formation of a molten aluminum weld pool within the aluminum workpiece.

The infusion of the high-melting temperature aluminide particles 110 into the molten aluminum weld pool 108 is thought to carry any residual oxide film fragments and composite residue film fragments up into the molten aluminum weld pool 108 and away from the faying surface 44 of the steel workpiece 14. Without being bound by theory, and with reference to the idealized illustrations of FIGS. 23-24, it is believed that the compressive force applied by the first and second welding electrodes 66, 68 and the softening of the aluminum workpiece 12 during current flow causes the surface layer 44 of a refractory oxide film, if present, to begin to fracture to thereby produce residual oxide film fragments 112. This initial action is shown in FIG. 23. And, if the workpiece stack-up 18 includes the intervening organic material layer 156 between the aluminum and steel workpieces 12, 14 (not shown here), the residual oxide film fragments 112 can become intimately intermixed with the decomposed organic material layer 156, e.g., such as adhesive material layer, at this time.

Eventually, as workpiece stack-up 10 continues to heat up within the weld zone 22, the aluminum substrate 32 of the aluminum workpiece 12 melts to form the molten aluminum weld pool 108, as shown in FIG. 24. The earlier thermal decomposition of the organic material layer 156 produces composite residue film fragments 114 comprised of, for example, refractory oxide material and residual organics such as carbon ash. The molten aluminum weld pool 108 leaches through the breaks and fissures between the residual oxide film fragments 112 and the composite residue film fragments 114 to wet the faying surface 44 of the steel workpiece 14 and, in the process, bring molten aluminum into contact with the reactive alloy surface layer 152, which is shown in-tack in FIG. 23 and while being shown consumed in FIG. 24. This type of contact between the molten aluminum weld pool 108 and the reactive alloy surface layer 152 leads to diffusive migration of the reactive constituent metal elements into the weld pool 108 and the formation of the high-melting temperature aluminide particles 110 underneath the fragments 112, 114, as shown in FIG. 24.

Figure 25:
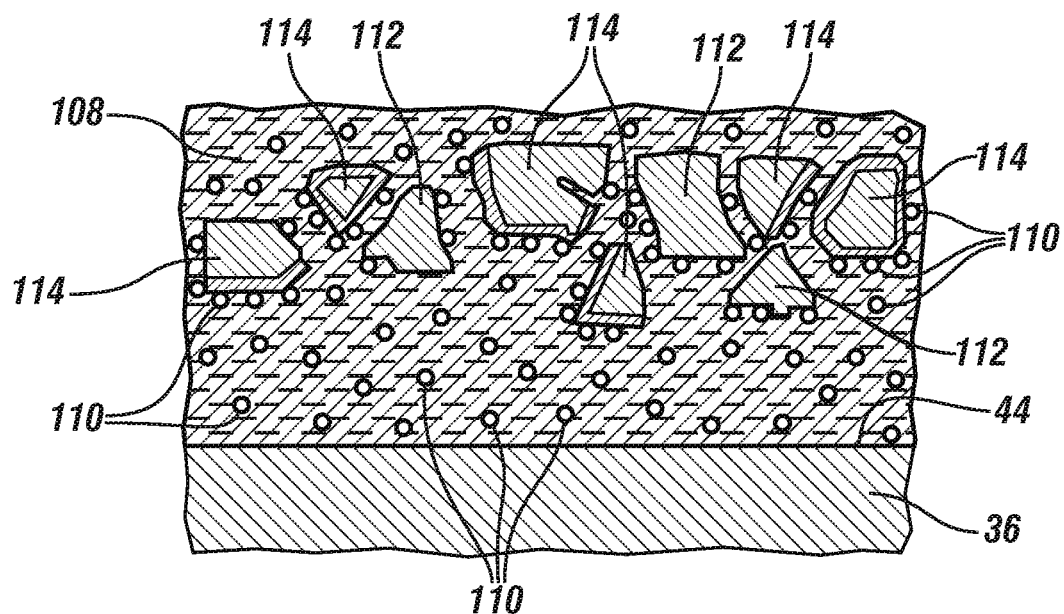
FIG. 25 is an idealized illustration showing the high-melting temperature aluminide particles sweeping away oxide fragments and composite organic residual fragments into the molten aluminum weld pool and away from the faying surface of the steel workpiece.

Next, as illustrated in FIG. 25, the high-melting temperature aluminide particles 110 are drawn away from the faying surface 44 of the steel workpiece 14 into the hotter portions of the molten aluminum weld pool 108. In following this trajectory, the high-melting temperature aluminide particles 110 causes the residual oxide film fragments 112 and the composite residue film fragments 114 to be carried away from the faying surface 44 of the steel workpiece 14 and into the interior region of the molten aluminum weld pool 108, thus redistributing those fragments 112, 114 to a more innocuous location, in the same way as previously described in connection with FIG. 12. The high-melting temperature aluminide particles 110 may also congregate towards the perimeter of the molten aluminum weld pool 108 when migrating away from the faying surface 36 of the steel workpiece 16 to ultimately settle into an annular ring near the perimeter of the molten aluminum weld pool 108 for the same reasons discussed above in the previous embodiment.

Figure 26:
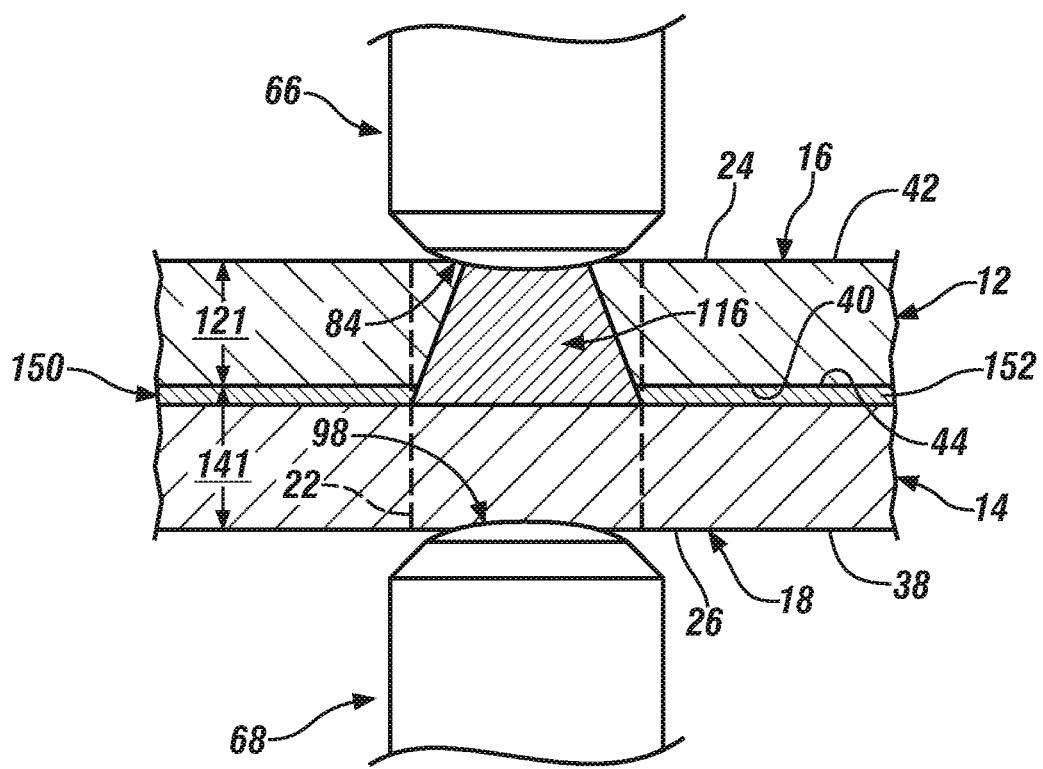
FIG. 26 is a general cross-sectional view of the workpiece stack-up and welding electrodes shown in FIG. 21 after passage of the electrical current between the welding electrodes and through the stack-up has ceased so as to allow the molten aluminum weld pool to solidify into a weld joint that weld bonds the adjacent aluminum and steel workpieces together.

The molten aluminum weld pool 108 solidifies into a weld joint 116 that bonds the aluminum and steel workpieces 12, 14 together within the weld zone 22 when the flow of electrical current between the weld faces 84, 98 of the welding electrodes 66, 68 is terminated, as shown in FIG. 26. The weld joint 116 has the same structure and characteristics as the weld joint 116 shown in FIGS. 13-16 and described above with respect to the previous embodiment of the disclosed method. In particular, the structure and composition of the aluminum weld nugget 124 and the intermetallic layer 126, as well as the possible settling of the high-temperature aluminide particles 110 into an annular ring 128 within the weld joint 116, as described above, are attributes that are common to this embodiment of the disclosed method as well. Indeed, the only notable difference between FIG. 13 and FIG. 26 is the fact that the composite adhesive material 20 is shown surrounding the weld joint 116 outside of the weld zone 22 in FIG. 13 while the reactive alloy surface layer 152 is shown surrounding the weld joint 116 outside of the weld zone 22 in FIG. 26. As such, the discussion set forth above regarding the weld joint 116, and especially the discussion of the weld joint 116 that corresponds to FIGS. 14-16, applies equally to this embodiment of the disclosed method including the benefits that incorporating the high-melting temperature aluminide particles 110 into weld joint 116 can have on the strength of joint 116 as a result of the migration of those particles 110 into the molten aluminum weld pool 108 and, in many cases, settling of those particles 110 into the structure of the annular ring 128. A duplicative discussion of the weld joint 116 depicted in FIG. 26 is thus omitted here for the sake of brevity.

The above description of preferred exemplary embodiments and specific examples are merely descriptive in nature; they are not intended to limit the scope of the claims that follow. Each of the terms used in the appended claims should be given its ordinary and customary meaning unless specifically and unambiguously stated otherwise in the specification.

The invention claimed is:

1. A method of resistance spot welding an aluminum workpiece and an adjacent overlapping steel workpiece, the method comprising:

locating a source of a reactive metal in a diffusible state along a faying interface of an aluminum workpiece and an adjacent overlapping steel workpiece, the reactive metal being able to react with molten aluminum to form metal aluminide particles, wherein the source of a reactive metal in a diffusible state is a reactive alloy surface layer that is part of the steel workpiece, the reactive alloy surface layer being adhered to a base metal substrate of the steel workpiece and having a thickness between 2 μm and 100 μm, the reactive alloy surface layer comprising a base metal element and one or more reactive constituent metal elements alloyed with the base metal element in a diffusible state, and wherein the reactive alloy surface layer of the steel workpiece makes proximate contact with a faying surface of the aluminum workpiece through an intervening organic material layer situated between the aluminum and steel workpieces at the faying interface;

pressing a weld face of a first welding electrode against an aluminum workpiece surface that provides a first side of the workpiece stack-up;

pressing a weld face of a second welding electrode against a steel workpiece surface that provides a second side of the workpiece stack-up;

passing an electrical current through a workpiece stack-up between the weld faces of the opposed first and second welding electrodes at a weld zone to melt the aluminum workpiece that lies adjacent to the steel workpiece and create a molten aluminum weld pool within the aluminum workpiece that wets a faying surface of the adjacent steel workpiece, and wherein contact between the molten aluminum weld pool and the source of a reactive metal in a diffusible state results in the formation of metal aluminide particles that migrate into the molten aluminum weld pool; and terminating passage of the electrical current between the weld faces of the opposed first and second welding electrodes to allow the molten aluminum weld pool to solidify into a weld joint.

2. The method set forth in claim 1, wherein the one or more reactive constituent metal elements result in aluminide particles being formed within the molten aluminum weld pool that include between 20 at % and 80 at % aluminum along with at least one of Fe, Ni, Co, Mn, or a combination thereof.

3. The method set forth in claim 1, wherein the reactive alloy surface layer is a galvanneal zinc-iron alloy layer, an electrodeposited zinc-nickel alloy layer, or an electrodeposited zinc-iron alloy layer.

4. The method set forth in claim 1, wherein the aluminum workpiece constitutes the aluminum workpiece surface that provides the first side of the workpiece stack-up and the steel workpieces constitutes the steel workpiece surface that provides the second side of the workpiece stack-up.

5. The method set forth in claim 1, wherein the metal aluminide particles that migrate into the molten aluminum weld pool end up settling into an annular ring of metal aluminide particles in the weld joint, the annular ring of metal aluminide particles extending upwardly from a weld bond surface of the weld joint and radially inwardly into an aluminum weld nugget of the weld joint.

* * * * *